(12) United States Patent
Bashir et al.

(10) Patent No.: US 10,714,128 B2
(45) Date of Patent: Jul. 14, 2020

(54) MAGNETIC WRITE HEAD WITH DUAL RETURN POLE

(71) Applicant: Western Digital Technologies, Inc., San Jose, CA (US)

(72) Inventors: Muhammad Asif Bashir, San Jose, CA (US); Petrus Antonius Van Der Heijden, Cupertino, CA (US); Alexander Goncharov, Morgan Hill, CA (US); Barry Stipe, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/157,233

(22) Filed: Oct. 11, 2018

(65) Prior Publication Data

US 2020/0118586 A1    Apr. 16, 2020

(51) Int. Cl.
| | | |
|---|---|---|
| *G11B 5/31* | (2006.01) | |
| *G11B 5/11* | (2006.01) | |
| *G11B 5/187* | (2006.01) | |
| *G11B 5/265* | (2006.01) | |
| *G11B 5/127* | (2006.01) | |
| *G11B 5/00* | (2006.01) | |

(52) U.S. Cl.
CPC ............ *G11B 5/187* (2013.01); *G11B 5/1278* (2013.01); *G11B 5/265* (2013.01); *G11B 5/314* (2013.01); *G11B 5/315* (2013.01); *G11B 5/3116* (2013.01); *G11B 5/3143* (2013.01); *G11B 5/11* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,212,379 B2 | 5/2007 | Hsu et al. | |
| 7,554,765 B2 | 6/2009 | Shukh et al. | |
| 7,643,246 B2 | 1/2010 | Yazawa et al. | |
| 7,692,896 B2 | 4/2010 | Kameda et al. | |
| 7,835,111 B2 | 11/2010 | Flint et al. | |
| 7,920,358 B2 * | 4/2011 | Jiang ............... | G11B 5/1278 360/125.06 |
| 8,164,855 B1 | 4/2012 | Gibbons et al. | |

(Continued)

FOREIGN PATENT DOCUMENTS

CN    101145347 B    5/2012

OTHER PUBLICATIONS

Michael Cordle, "Effects of Skew Angle and Transition Curvature in HAMR Hard Disk Drives," University of Minnesota Masters Thesis dated May 2017 (available at https://conservancy.umn.edu/handle/11299/188808).

*Primary Examiner* — Jefferson A Evans
(74) *Attorney, Agent, or Firm* — Jacobsen IP Law; Krista S. Jacobsen

(57) ABSTRACT

Disclosed herein are magnetic write heads and data storage devices comprising such write heads. A magnetic write head comprises a leading side, a trailing side, an air-bearing surface (ABS), a main pole disposed between the leading side and the trailing side and extending to the ABS, a first return pole disposed between the main pole and the leading side, and a second return pole disposed between the main pole and the trailing side. One or both of the main pole and the second return pole may be tapered.

16 Claims, 20 Drawing Sheets

(56) References Cited

U.S. PATENT DOCUMENTS

| | | |
|---|---|---|
| 8,194,512 B2 | 6/2012 | Stipe |
| 8,279,719 B1 | 10/2012 | Hu et al. |
| 8,289,650 B2 | 10/2012 | Seigler et al. |
| 8,307,540 B1 | 11/2012 | Tran et al. |
| 8,310,901 B1 | 11/2012 | Batra et al. |
| 8,331,205 B2 | 12/2012 | Seigler et al. |
| 8,416,530 B2 | 4/2013 | Gao et al. |
| 8,432,638 B2 | 4/2013 | Sechi |
| 8,451,555 B2 | 5/2013 | Seigler et al. |
| 8,477,452 B2 * | 7/2013 | Sasaki ............... G11B 5/3116 360/125.13 |
| 8,630,153 B1 | 1/2014 | Wang et al. |
| 8,649,124 B2 * | 2/2014 | Zou .................. G11B 5/1278 360/125.17 |
| 8,649,245 B2 | 2/2014 | Goulakov et al. |
| 8,659,980 B2 | 2/2014 | Seigler et al. |
| 8,873,352 B1 | 10/2014 | Jandric et al. |
| 8,929,028 B2 | 1/2015 | Hsiao et al. |
| 9,042,209 B2 | 5/2015 | Balamane et al. |
| 9,087,546 B1 * | 7/2015 | Grobis ............ G11B 11/10536 |
| 9,153,254 B1 * | 10/2015 | Rivkin .................... G11B 5/17 |
| 9,311,935 B2 | 4/2016 | Clinton et al. |
| 9,355,661 B2 | 5/2016 | Seigler et al. |
| 9,443,541 B1 | 9/2016 | Liu et al. |
| 9,472,230 B1 * | 10/2016 | Sasaki .................. G11B 5/012 |
| 9,672,846 B1 * | 6/2017 | Tanaka .................... G11B 5/17 |
| 9,741,377 B1 * | 8/2017 | Sasaki ................ G11B 5/1272 |
| 9,805,753 B2 * | 10/2017 | Ho ...................... G11B 5/1278 |
| 10,657,998 B1 | 5/2020 | Wessel |
| 2003/0128633 A1 | 7/2003 | Batra et al. |
| 2004/0190197 A1 | 9/2004 | Watabe et al. |
| 2004/0201918 A1 | 10/2004 | Guan et al. |
| 2005/0128637 A1 * | 6/2005 | Johnston ............ G11B 5/1278 360/125.12 |
| 2005/0219764 A1 | 10/2005 | Kameda et al. |
| 2006/0082931 A1 | 4/2006 | Fukui et al. |
| 2006/0209459 A1 | 9/2006 | Im et al. |
| 2007/0064343 A1 | 3/2007 | Yazawa et al. |
| 2007/0285837 A1 | 12/2007 | Im et al. |
| 2008/0088972 A1 * | 4/2008 | Sasaki .................... G11B 5/112 360/110 |
| 2008/0239568 A1 | 10/2008 | Miyatake et al. |
| 2009/0073858 A1 | 3/2009 | Seigler et al. |
| 2009/0190256 A1 | 7/2009 | Schabes et al. |
| 2009/0296275 A1 * | 12/2009 | Sasaki ................ G11B 5/3116 360/125.3 |
| 2010/0128579 A1 | 5/2010 | Seigler et al. |
| 2010/0157472 A1 * | 6/2010 | Hsiao .................... G11B 5/112 360/123.12 |
| 2010/0188783 A1 | 7/2010 | Taguchi |
| 2010/0208391 A1 | 8/2010 | Gokemeijer |
| 2013/0028059 A1 | 1/2013 | Huang et al. |
| 2015/0122772 A1 | 5/2015 | Clinton et al. |
| 2015/0199177 A1 * | 7/2015 | Braganca ................ G06F 7/588 365/158 |
| 2016/0210994 A1 * | 7/2016 | Sasaki ................ G11B 5/6088 |
| 2016/0372140 A1 * | 12/2016 | Bian .................... G11B 5/3163 |
| 2017/0047089 A1 * | 2/2017 | Rajauria ............. G11B 5/6076 |
| 2017/0206917 A1 * | 7/2017 | Kunkel ............... G11B 5/3133 |
| 2017/0278532 A1 * | 9/2017 | Ho .......................... G11B 5/23 |
| 2017/0287511 A1 * | 10/2017 | Rajauria ................ G11B 5/314 |
| 2017/0323659 A1 | 11/2017 | Matsumoto |
| 2019/0066719 A1 * | 2/2019 | Macken ............... G11B 5/3967 |

\* cited by examiner

MAGNETIC WRITE HEAD WITH DUAL RETURN POLE

BACKGROUND

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, may result in a requirement for write heads that incorporate higher-magnetic-moment materials, or techniques such as perpendicular recording (or both).

One additional solution has been proposed, which uses heat to lower the effective coercivity of a localized region on the magnetic media surface and writes data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR). The term "HAMR" is used herein to refer to all of TAR, TAMR, EAMR, and HAMR.

There is an ongoing need to improve the performance of write heads, including HAMR write heads.

SUMMARY

This summary represents non-limiting embodiments of the disclosure.

Disclosed herein are write heads with dual return poles for data storage devices and data storage devices (e.g., hard disk drives) comprising such write heads. A magnetic write head comprises a leading side, a trailing side, an air-bearing surface (ABS), a main pole disposed between the leading side and the trailing side and extending to the ABS, a first return pole disposed between the main pole and the leading side, and a second return pole disposed between the main pole and the trailing side.

In some embodiments, the main pole comprises a tapered portion at the ABS, wherein the tapered portion comprises a trailing-side edge at an angle to the ABS, wherein the angle is less than 90 degrees. In some such embodiments, the trailing-side edge is a first trailing-side edge and the angle is a first angle, and the tapered portion further comprises a second trailing-side edge recessed from the ABS and at a second angle from the ABS, wherein the second angle is less than 90 degrees. The first and second angles may be substantially equal, or the second angle may be less than the first angle. In some embodiments, the second angle is approximately zero.

In some embodiments in which the main pole comprises a tapered portion, the tapered portion further comprises a third trailing-side edge, wherein the third trailing-side edge is disposed between the first trailing-side edge and the second trailing-side edge, and wherein the third trailing-side edge is substantially perpendicular to the ABS.

In some embodiments in which the main pole comprises a tapered portion, the tapered portion is a first tapered portion, and the second return pole comprises a second tapered portion at the ABS and extending toward the main pole.

In some embodiments, the second return pole comprises a tapered portion at the ABS and extending toward the main pole. In some such embodiments, the tapered portion comprises a main-pole-facing edge at an angle from the ABS, wherein the angle is greater than 90 degrees. In some embodiments, the tapered portion comprises a first main-pole-facing edge and a second main-pole-facing edge, wherein each of the first and second main-pole-facing edges is substantially perpendicular to the ABS. In some such embodiments, the tapered portion further comprises a third main-pole-facing edge, wherein the third main-pole-facing edge is substantially perpendicular to the ABS.

In some embodiments, a magnetic write head comprises an air-bearing surface (ABS), a main pole extending to the ABS, a first return pole extending to the ABS and disposed between the main pole and a leading side of the magnetic write head, and a second return pole disposed between the main pole and a trailing side of the magnetic write head, wherein the second return pole comprises a tapered portion adjacent to the ABS, wherein the tapered portion extends in a direction toward the main pole. In some such embodiments, a distance between the main pole and the second return pole is between approximately 600 nm and 1000 nm.

In some embodiments, the tapered portion comprises a stacked structure. In some embodiments, the tapered portion comprises a wedge.

In some embodiments, the tapered portion is a first tapered portion, and the main pole comprises a second tapered portion adjacent to the ABS, wherein the second tapered portion extends in a direction toward the first return pole. In some such embodiments, the first tapered portion comprises a wedge or a stacked structure. In some embodiments, the second tapered portion comprises an edge facing the second return pole, wherein the edge is at an angle to the ABS, wherein the angle is less than 90 degrees.

BRIEF DESCRIPTION OF THE DRAWINGS

Objects, features, and advantages of the disclosure will be readily apparent from the following description of certain embodiments taken in conjunction with the accompanying drawings in which.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim or claims.

Figure 1:
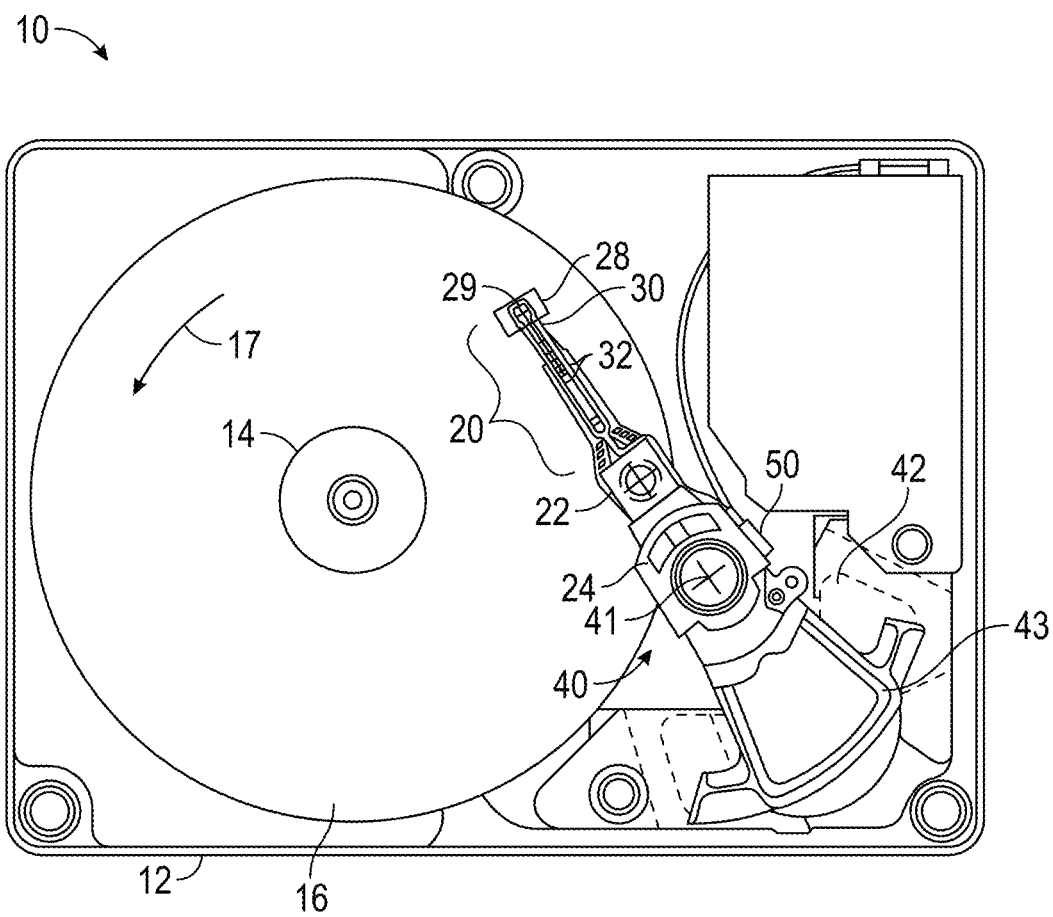
FIG. 1 illustrates a hard disk drive into which the embodiments disclosed herein may be incorporated.

FIG. 1 is a top view of a head/disk assembly of a hard disk drive 10 with the cover removed. The disk drive 10 includes a rigid base 12 supporting a spindle 14 that supports at least one disk 16. The spindle 14 is rotated by a spindle motor (not shown), which, in operation, rotates the at least one disk 16 in the direction shown by the curved arrow 17. The hard disk drive 10 has at least one load beam assembly 20 having an integrated lead suspension (ILS) or flexure 30 with an array 32 of electrically conductive interconnect traces or lines. The at least one load beam assembly 20 is attached to rigid arms 22 connected to an E-shaped support structure, sometimes called an E-block 24. The flexure 30 is attached to an air-bearing (or, in the case that helium or another gas is used instead of air inside the disk drive, a gas-bearing) slider 28. A magnetic recording read/write head 29 is located at the end or trailing edge of the slider 28. The flexure 30 enables the slider 28 to "pitch" and "roll" on an air (or gas) bearing generated by the rotating disk 16.

The disk drive 10 also includes a rotary actuator assembly 40 rotationally mounted to the rigid base 12 at a pivot point 41. The actuator assembly 40 may include a voice coil motor (VCM) actuator that includes a magnet assembly 42 fixed to the base 12 and a voice coil 43. When energized by control circuitry (not shown), the voice coil 43 moves and thereby rotates E-block 24 with attached arms 22 and the at least one load beam assembly 20 to position the read/write head 29 over the data tracks on the disk 16. The trace interconnect array 32 connects at one end to the read/write head 29 and at its other end to read/write circuitry contained in an electrical module or chip 50, which, in the exemplary disk drive 10 of FIG. 1, is secured to a side of the E-block 24. The chip 50 includes a read/write integrated circuit (R/W IC).

As the disk 16 rotates, the disk 16 drags air or another gas (e.g., helium) under the slider 28 and along the air-bearing surface (ABS) of the slider 28 in a direction approximately parallel to the tangential velocity of the disk 16. As the air passes under the ABS, air compression along the air flow path causes the air pressure between the disk 16 and the ABS to increase, which creates a hydrodynamic lifting force that counteracts the tendency of the at least one load beam assembly 20 to push the slider 28 toward the disk 16. The slider 28 thus flies above the disk 16 but in close proximity to the surface of the disk 16.

The slider 28 supports the read/write head 29. As the disk 16 rotates in the direction of the arrow 17, the movement of the actuator assembly 40 allows the read/write head 29 on the slider 28 to access different data tracks on the disk 16. The slider 28 is typically formed of a composite material, such as a composite of alumina/titanium-carbide ($Al_2O_3$/TiC). FIG. 1 illustrates only one disk 16 surface with associated slider 28 and read/write head 29, but there may be multiple disks 16 stacked on a hub that is rotated by a spindle motor, with a separate slider 28 and read/write head 29 associated with each surface of each disk 16.

For writing, the read/write head 29 may be a perpendicular recording head that includes a main pole and a return pole. The main pole and return pole are separated from each other by a write gap at the ABS and are connected to each other at a region distal from the ABS by a back gap closer or back via. One or more layers of conductive coils, encapsulated by insulating layers, are positioned between the main pole and the return pole. To write data to the disk 16, an electric current flows through the conductive coils to induce a magnetic field across the write gap between the main pole and the return pole. By reversing the direction of the current through the coil(s), the polarity of the data written to the magnetic media may be reversed.

In some embodiments, the read/write head 29 includes a HAMR-enabled write head. (As stated previously, the term "HAMR" as used herein refers to all variants of thermally-assisted recording, including TAR, TAMR, EAMR, and HAMR.) In HAMR, a magnetic recording material with high magneto-crystalline anisotropy ($K_u$) is heated locally while the HAMR-enabled write head writes to lower the coercivity enough for writing to occur, but the coercivity/ anisotropy is high enough that the recorded bits are thermally stable at the ambient temperature of the disk drive (i.e., the normal operating or "room" temperature of approximately 15-30 degrees Celsius). In some proposed HAMR systems, the magnetic recording material is heated to near or above its Curie temperature. The recorded data may then be read back at ambient temperature by a conventional magnetoresistive read head. HAMR disk drives have been proposed for both conventional continuous media, wherein the magnetic recording material is a continuous layer on the disk, and for bit-patterned media (BPM), in which the magnetic recording material is patterned into discrete data islands or "bits."

One type of HAMR-enabled write head uses a laser source and an optical waveguide coupled to a near-field transducer (NFT) for heating the recording material on the disk. Light from the laser source heats a portion of the magnetic recording medium (e.g., the disk 16) prior to a write operation being performed. The NFT is typically located at the ABS of the slider that rides or "flies" above the disk surface. A NFT may have a generally triangular output end, such that an evanescent wave generated at a surface of the waveguide couples to surface plasmons excited on the surface of the NFT, and a strong optical near-field is generated at the apex of the triangular output end.

The light from the laser can be focused via a waveguide core layer and the NFT on a precise location of the magnetic medium to reduce the coercivity of that location of the magnetic medium prior to the main write pole performing a write operation. This allows improved areal density to be achieved by allowing the laser to be focused precisely so that the light can be directed at the desired location on the magnetic recording medium. A semiconductor laser with a wavelength of, for example, 780 to 980 nm may be used as the HAMR light source. The laser may be supported on the top of the slider 28, or it may be located on the flexure 30 and coupled to the slider 28 by an optical channel.

In operation, after the voice coil 43 has positioned the read/write head 29 over the data tracks on the disk 16, the read/write head 29 (e.g., a HAMR-enabled write head) may be used to write information to one or more tracks on the surface of the disk 16 and to read previously-recorded information from the tracks on the surface of the disk 16. The tracks may comprise discrete data islands of magnetizable material (e.g., bit-patterned media), or the disk 16 may have a conventional continuous magnetic recording layer of magnetizable material. Processing circuitry in the hard drive 10 (e.g., on the chip 50) provides to the read/write head 29 signals representing information to be written to the disk 16 and receives from the read/write head 29 signals representing information read from the disk 16.

To read information from the disk 16, the read/write head 29 may include at least one read sensor. The read sensor(s) in the read/write head 29 may include, for example, one or more giant magnetoresistance (GMR) sensors, tunneling magnetoresistance (TMR) sensors, or another type of magnetoresistive sensor. When the slider 28 passes over a track on the disk 16, the read/write head 29 detects changes in resistance due to magnetic field variations recorded on the disk 16, which represent the recorded bits.

Figure 2:
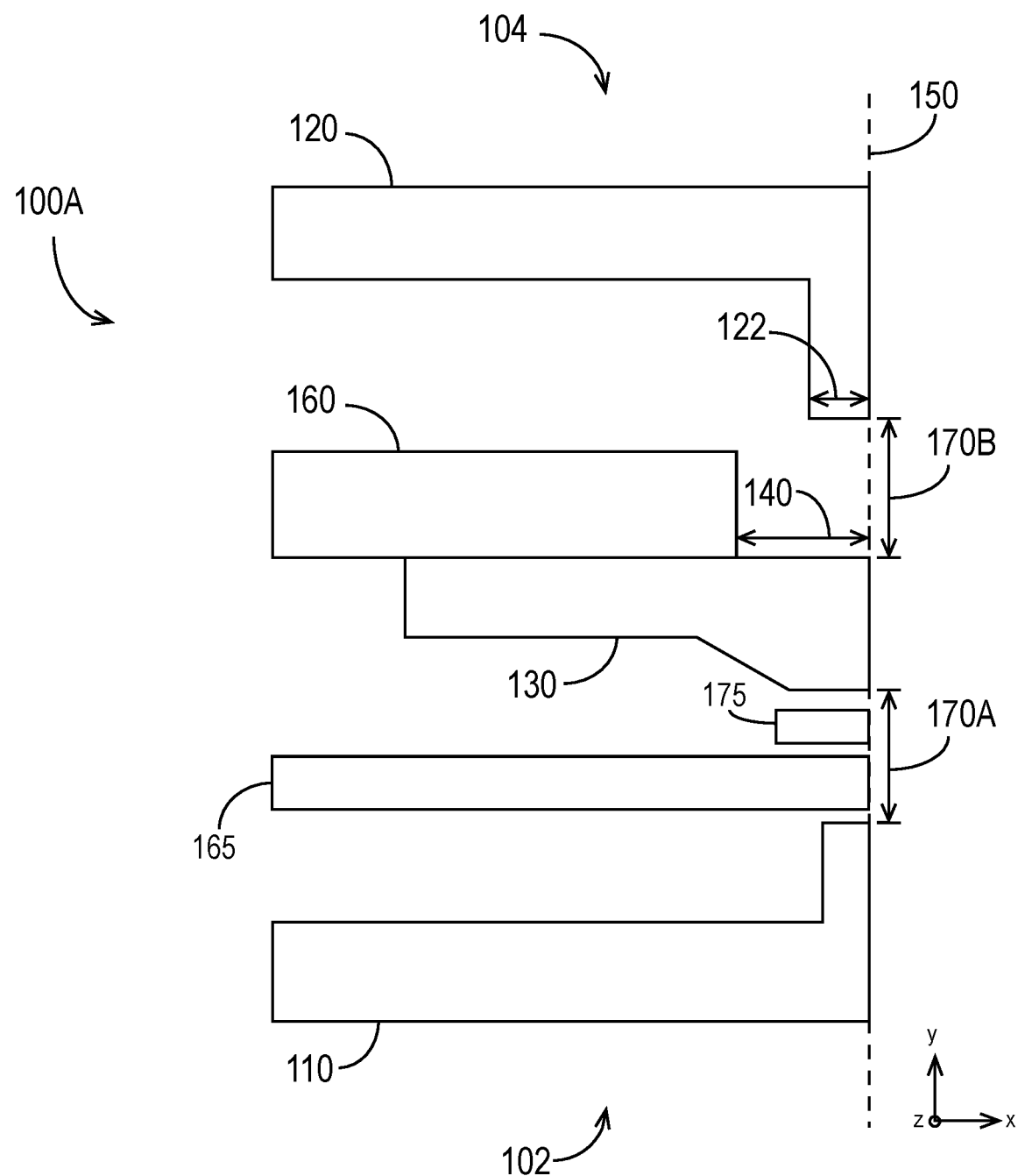
FIG. 2 is a cross-sectional schematic of a portion of an exemplary magnetic write head in accordance with some embodiments.

FIG. 2 is a cross-sectional schematic of a portion of an exemplary magnetic write head 100A in accordance with some embodiments. The magnetic write head 100A is included in a slider 28, and may include layers and/or components that are not illustrated in FIG. 2. The magnetic write head 100A has a leading side 102, a trailing side 104, and an ABS 150. The leading side 102 is closer than the trailing side 104 to the leading edge of the slider 28, and the trailing side 104 is closer than the leading side 102 to the trailing edge of the slider 28. The leading side 102 passes over the region of the media to be written before the trailing side 104 passes over. In other words, referring to FIG. 1 and the arrow 17 showing the direction in which the disk 16 rotates, the leading side 102 is closer than the trailing side 104 to the pivot point 41.

The magnetic write head 100A includes a stitching layer 160 coupled to a main pole 130, which is configured to emit a recording magnetic field for affecting the magnetic media. The main pole 130 serves as a first electrode and has a front portion at the ABS 150. The magnetic write head 100A also includes a first return pole 110, which serves as a second electrode and also has a front portion at the ABS 150. As shown in FIG. 2, the first return pole 110 is closer to the leading side 102 than is the main pole 130. Similarly, the main pole 130 is closer to the trailing side 104 than is the first return pole 110. The stitching layer 160 is recessed from the ABS 150 by a distance 140.

The magnetic write head 100A, which may be a HAMR head, may also include a NFT 175 and a waveguide 165, which may be positioned between the main pole 130 and the first return pole 110. In embodiments in which the magnetic write head 100A includes a NFT 175 and waveguide 165, during operation, electromagnetic energy (e.g., light) from a laser source is introduced into the waveguide 165 and propagates along the length of the waveguide 165. An evanescent wave is generated at the surface of the waveguide 165 proximate the ABS 150. The evanescent wave polarizes in a direction along the plane of the ABS 150, coupling to a surface plasmon excited on the surface of the NFT 175 output tip. The surface plasmon causes charges to move in a down-track direction and concentrate in the space at the ABS 150 between the NFT 175 output tip and the end of the main pole 130, subsequently generating a localized electrical field that is known as an optical near-field spot. The electric field heats a portion of the hard recording layer of the magnetic media, thereby lowering its coercivity in the specific portion or "bit" so that the magnetic field from the main pole 130 can alter its magnetization. The main pole 130 then applies a magnetic field and affects the magnetization of the portion of the magnetic media at the optical near-field spot.

As shown in FIG. 2, at the ABS 150, the main pole 130 and the first return pole 110 are separated by a distance 170A. A first flux closure path for the main pole 130 is provided by the first return pole 110, which may be, relatively speaking, a considerable distance from the main pole 130, particularly if a waveguide 165 and NFT 175 are situated between the main pole 130 and the first return pole 110 as described above. Larger distances 170A can result in slower saturation (and, therefore, slower switching speed) relative to smaller distances 170A. Therefore, to improve switching speed and performance of the magnetic write head 100A, it is desirable to improve the flux closure.

One way to improve the switching speed and performance of the magnetic write head 100A is to reduce the distance 170A between the main pole 130 and the first return pole 110. But, when the magnetic write head 100A includes HAMR optics, doing so may reduce the optical efficiency, which can have a negative impact on the performance of the magnetic write head 100A. Furthermore, reducing the distance 170A between the main pole 130 and the first return pole 110 can undesirably increase the down-track component of the write field while decreasing the perpendicular component. Therefore, there is a need for solutions that improve switching speed (i.e., the time needed to switch the magnetic polarization of the poles of the magnetic write head) without incurring substantial optical losses and magnetic field degradations (e.g., decreases in the perpendicular component and/or increases in the down-track component).

To improve the flux closure, the exemplary embodiment of FIG. 2 provides a second return pole 120 between the main pole 130 and the trailing side 104. The main pole 130 and first and second return poles 110, 120 are both constructed of a magnetic material that produces a high saturation flux density, such as, for example, NiFe, CoFeNi, or CoFe. In the embodiment of FIG. 2, the second return pole 120 has a similar shape to the first return pole 110, except that it extends toward the main pole 130 at the ABS 150. The portion of the second return pole 120 that extends toward the main pole 130 has a height 122 extending in the direction perpendicular to the ABS 150. At the ABS 150, the second return pole 120 ends a distance 170B from the main pole 130. The distance 170B may be, for example, between approximately 600 nm and approximately 1000 nm. The distances 140, 170B and the height 122 of the second return pole 120 may be optimized to improve the flux closure.

Figure 3A:
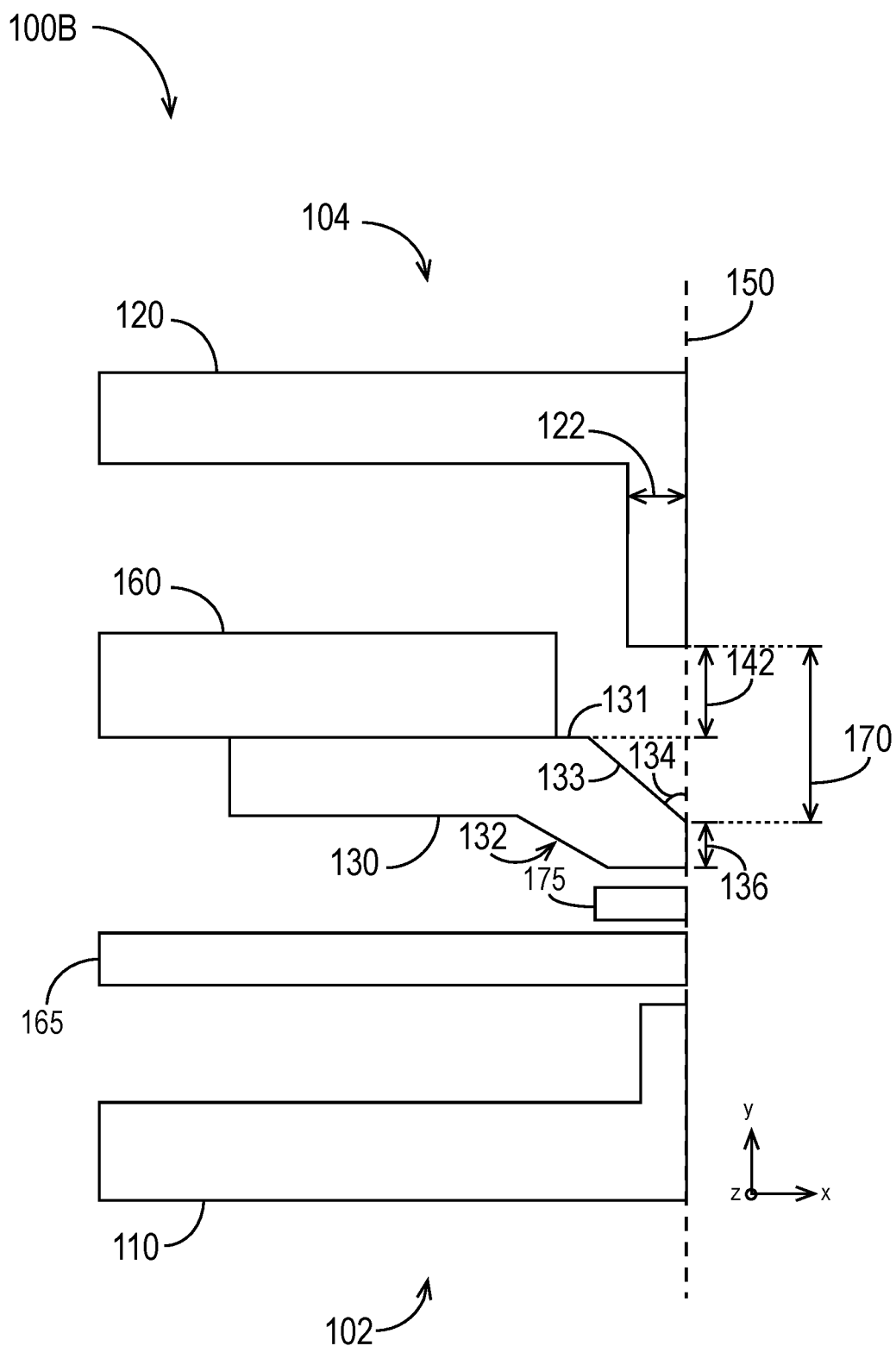
FIG. 3A is a cross-sectional schematic of a portion of an exemplary magnetic write head in accordance with some embodiments.
Figure 3B:
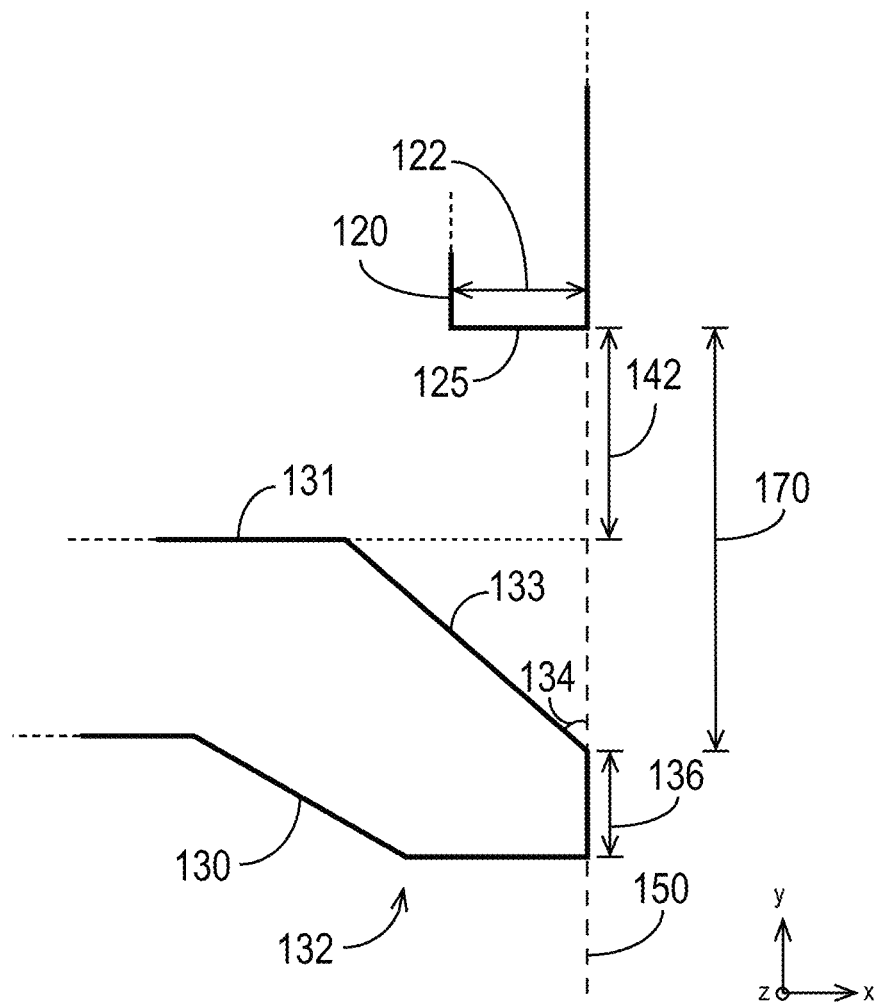
FIG. 3B is a closer view of portions of the main pole and second return pole.

FIG. 3A is a cross-sectional schematic of a portion of an exemplary magnetic write head 100B in accordance with some embodiments, and FIG. 3B is a closer view of portions of the main pole 130 and second return pole 120 of the magnetic write head 100B. Like the magnetic write head 100A of FIG. 2, the magnetic write head 100B of FIG. 3A includes a main pole 130, a stitch layer 160, a first return pole 110, a waveguide 165, a NFT 175, and a second return pole 120. The stitch layer 160, first return pole 110, waveguide 165, NFT 175, and second return pole 120 shown in FIG. 3A were described in the discussion of FIG. 2, and that description is not repeated here.

In the embodiment shown in FIGS. 3A and 3B, the main pole 130 includes a tapered portion 132 at the ABS 150 (i.e., the tapered portion 132 extends to the ABS 150). As shown, the tapered portion 132 becomes progressively smaller toward the ABS 150. The tapered portion 132 has a trailing-side edge 133 that is at an angle 134 to the ABS 150. In the embodiment shown in FIGS. 3A and 3B, the angle 134 is less than 90 degrees. At the ABS 150, the tapered portion 132 extends for a distance 136 in the down-track direction (i.e., in the y-direction using the axes shown in FIGS. 3A and 3B). In the embodiment illustrated in FIGS. 3A and 3B, the tapered portion 132 extends in a direction toward the first return pole 110. In other embodiments, the tapered portion 132 may extend in a direction toward the second return pole 120.

At the ABS 150, the main pole 130 and the second return pole 120 are separated by a distance 170. The distance 170 may be, for example, between approximately 600 nm and approximately 1000 nm. The main pole 130 has an edge 131 that is substantially perpendicular to the ABS 150. The second return pole 120 has a main-pole-facing edge 125, which, as shown in FIG. 3B, is substantially perpendicular to the ABS 150. The main-pole-facing edge 125 and a projection of the edge 131 to the ABS 150 are separated by a distance 142 at the ABS 150. The height 122 (which is also the length of the main-pole-facing edge 125 in the embodiment of FIGS. 3A and 3B), the distances 136, 142, and 170, the angle 134, and the length of the edge 133 (and other characteristics, including other dimensions, angles, materials, etc.) may be selected or optimized (e.g., jointly) to provide a desired level of improvement in the flux closure.

Figure 4A:
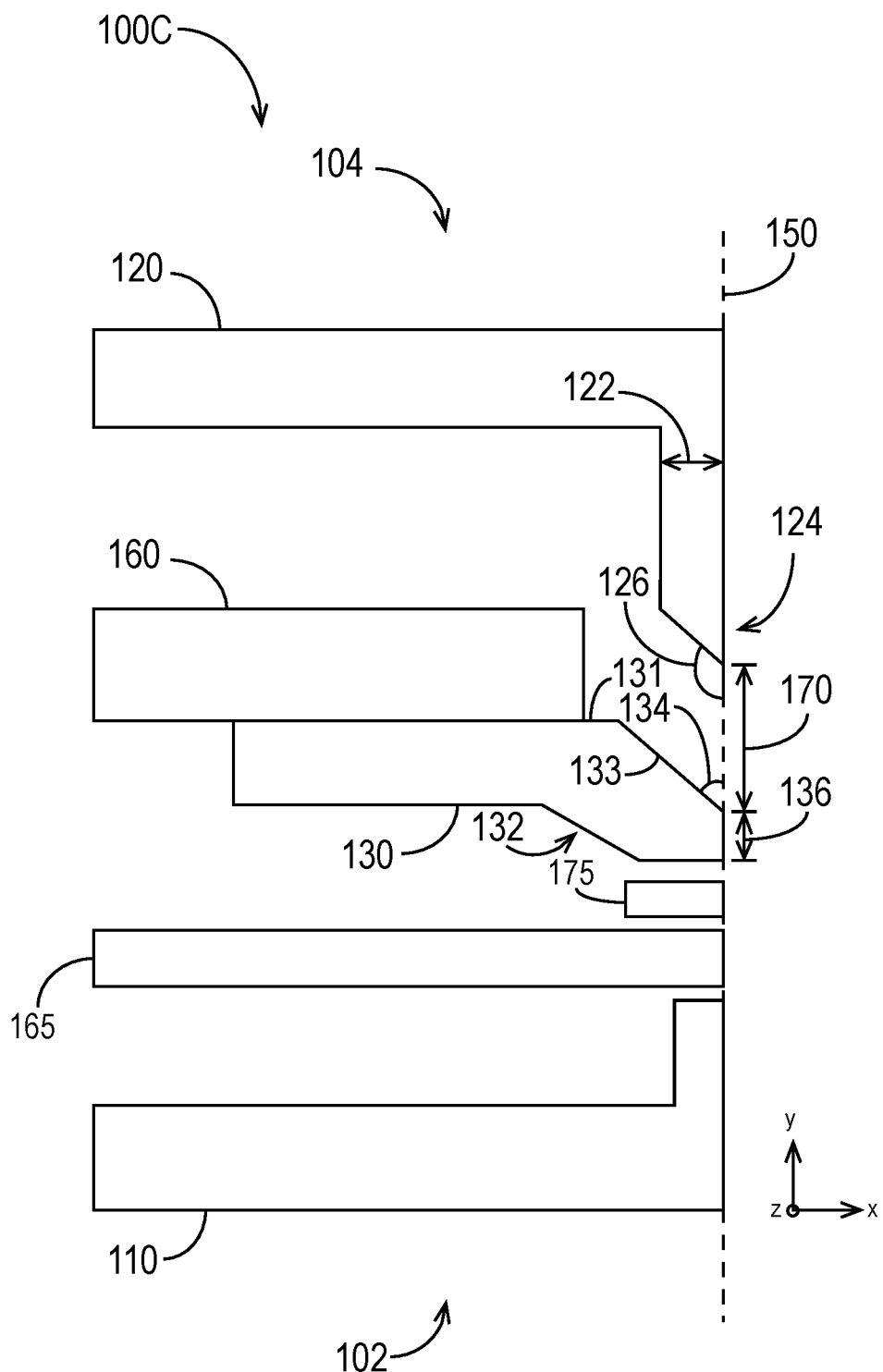
FIG. 4A is a cross-sectional schematic of a portion of an exemplary magnetic write head in accordance with some embodiments.
Figure 4B:
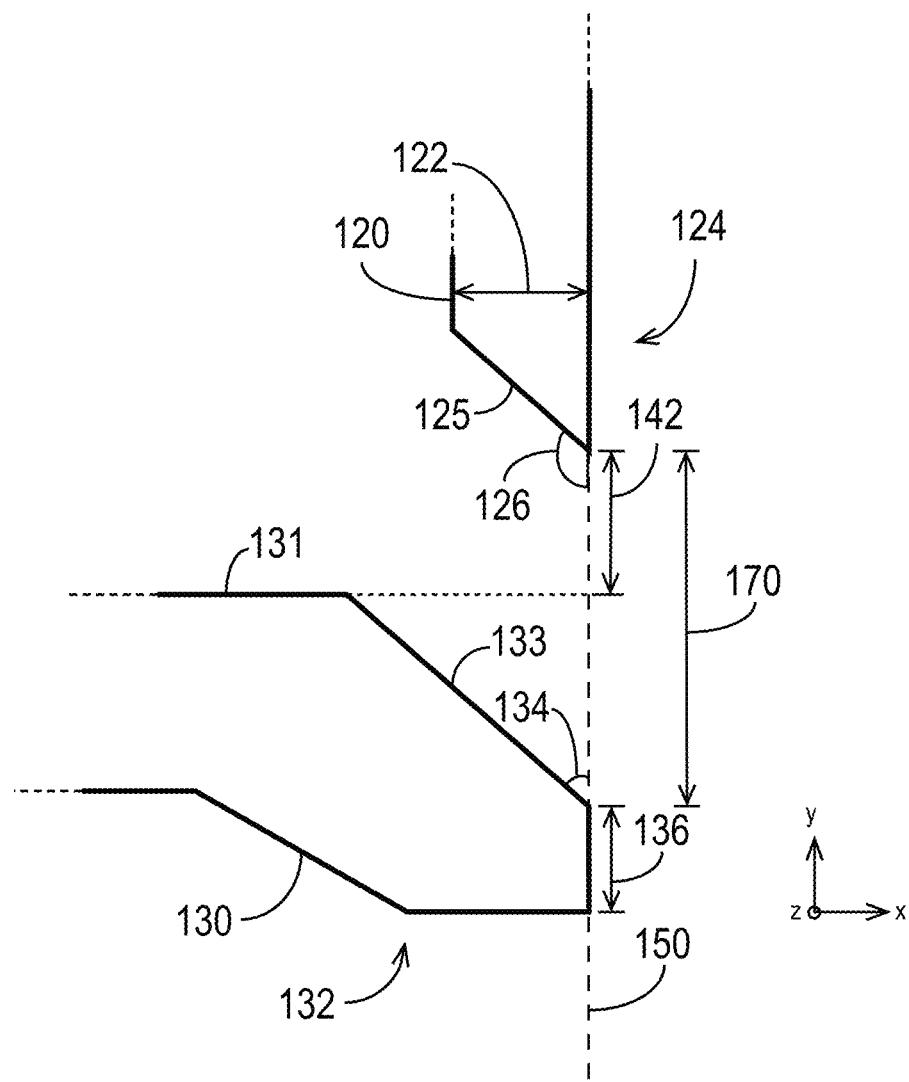
FIG. 4B is a closer view of portions of the main pole and second return pole.

FIG. 4A is a cross-sectional schematic of a portion of an exemplary magnetic write head 100C in accordance with some embodiments, and FIG. 4B is a closer view of portions of the main pole 130 and second return pole 120 of the magnetic write head 100C. Like the magnetic write heads 100A and 100B of FIGS. 2A-3A, the magnetic write head 100C of FIGS. 4A and 4B includes a main pole 130, a stitch layer 160, a first return pole 110, a waveguide 165, a NFT 175, and a second return pole 120. In the embodiment of FIGS. 4A and 4B, both the main pole 130 and the second return pole 120 include tapered portions 132, 124 at the ABS 150. The main pole 130 and its tapered portion 132 were described in the discussion of FIGS. 3A and 3B, and that description is not repeated here.

In the exemplary magnetic write head 100C, the second return pole 120 also includes a tapered portion 124. The tapered portion 124 has a main-pole-facing edge 125 that is at an angle 126 to the ABS 150. In the embodiment illustrated in FIGS. 4A and 4B, the angle 126 is greater than 90 degrees, thus making the tapered portion 124 a wedge. The angles 126 and 134 may be in some relation (e.g., they may be supplementary angles), or they may have no relationship to each other. The main-pole-facing edge 125 and a projection of the edge 131 to the ABS 150 are separated by a distance 142 at the ABS 150.

The tapered portion 124 of the second return pole 120 extends toward the main pole 130 and has a maximum height 122, as measured from the ABS 150. As will be appreciated by skilled artisans, the length of the main-pole-facing edge 125 may be derived from the height 122 and the angle 126 (i.e., as the maximum height 122 divided by the sine of the supplementary angle to the angle 126 (i.e., 180 degrees minus the angle 126)).

At the ABS 150, the main pole 130 and the second return pole 120 are separated by a distance 170. The distance 170 may be, for example, between approximately 600 nm and approximately 1000 nm. The maximum height 122, the distance 136, the distance 170, the angles 126, 134, and the lengths of the edges 125, 133 (as well as any other characteristics, e.g., dimensions, materials, etc.) may be selected or optimized (e.g., jointly) to provide a desired level of improvement in the flux closure.

Figure 5A:
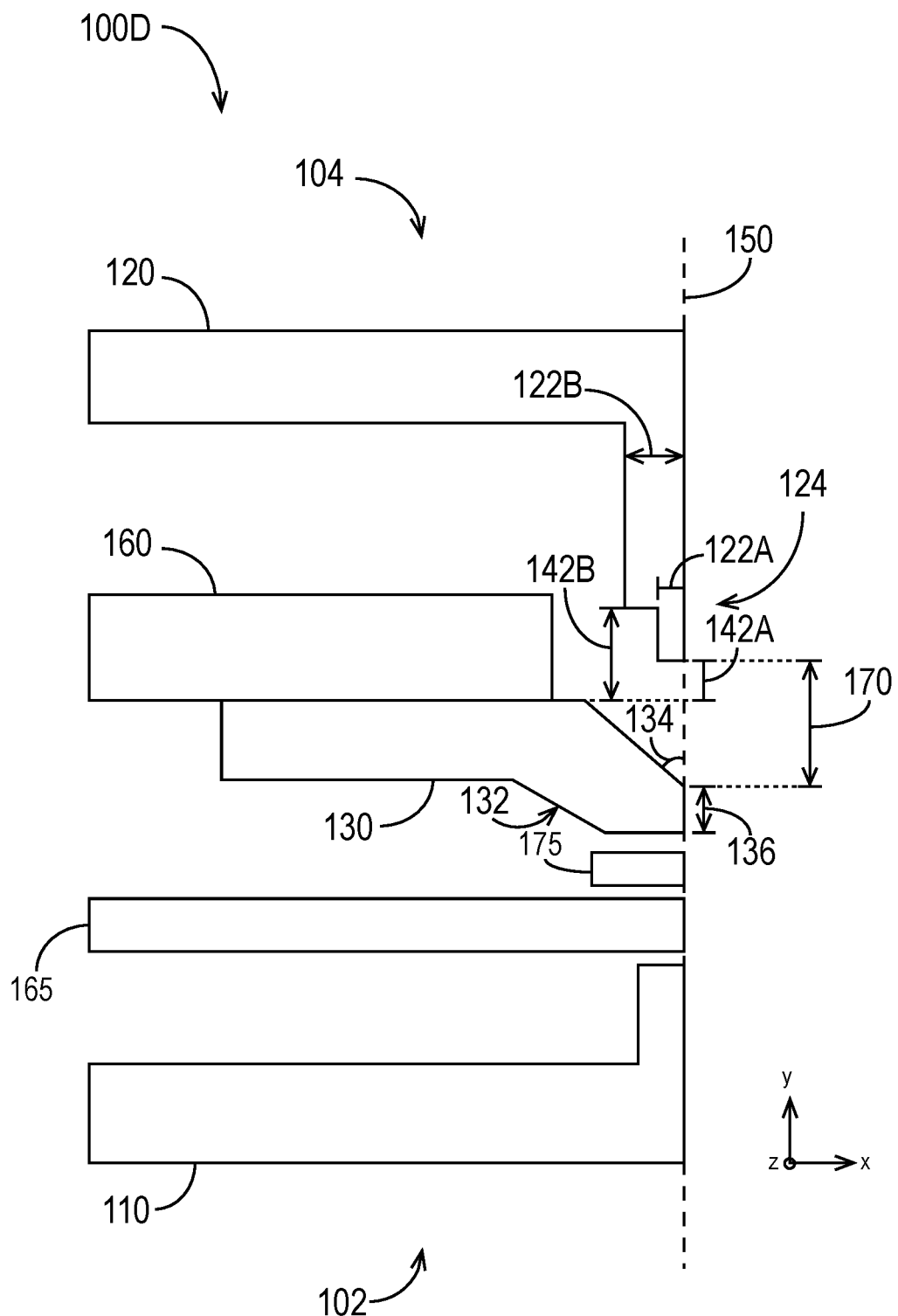
FIG. 5A is a cross-sectional schematic of a portion of an exemplary magnetic write head in accordance with some embodiments.
Figure 5B:
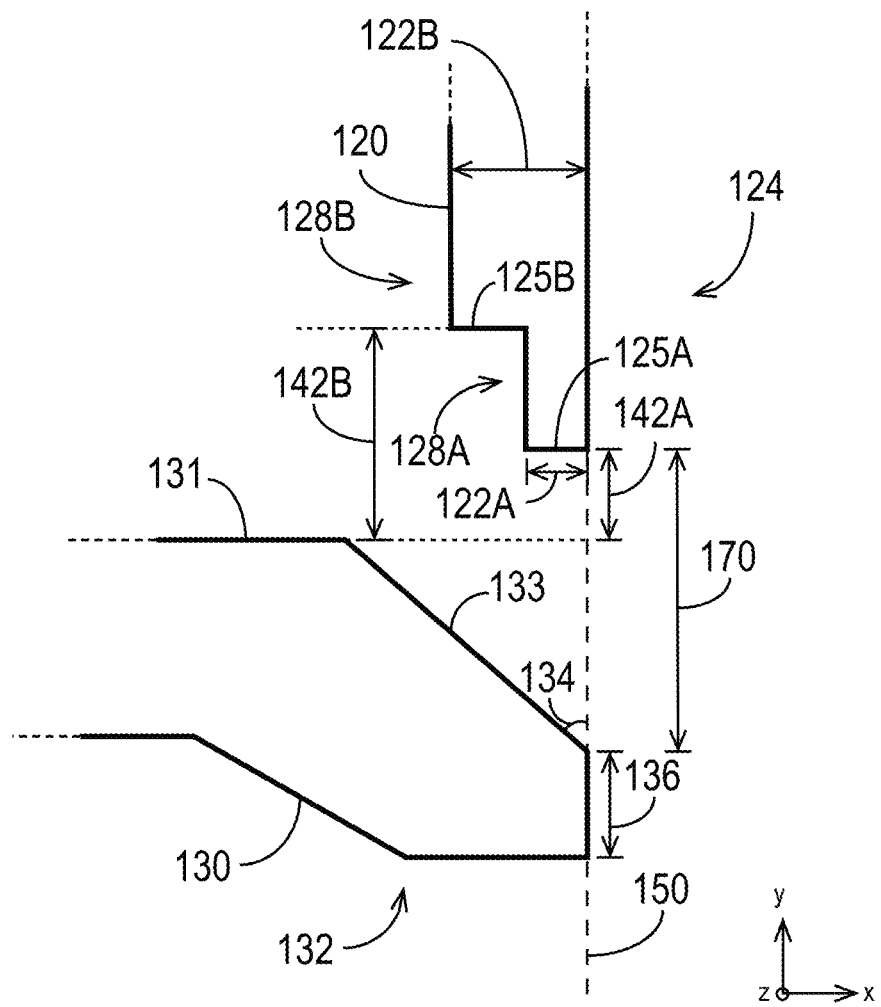
FIG. 5B is a closer view of portions of the main pole and second return pole.

FIG. 5A is a cross-sectional schematic of a portion of an exemplary magnetic write head 100D in accordance with some embodiments, and FIG. 5B is a closer view of portions of the main pole 130 and second return pole 120 of the magnetic write head 100D. Like the magnetic write heads 100A, 100B, and 100C of FIGS. 2A-4B, the magnetic write head 100D of FIGS. 5A and 5B includes a main pole 130, a stitch layer 160, a first return pole 110, a waveguide 165, a NFT 175, and a second return pole 120. The stitch layer 160, waveguide 165, NFT 175, and first return pole 110 were described in the discussion of FIG. 2, and that description is not repeated here. The main pole 130 with a tapered portion 132 was described in the discussion of FIGS. 3A and 3B, and that description is not repeated here.

The exemplary magnetic write head 100D also includes a second return pole 120 with a tapered portion 124. In the exemplary embodiment of FIGS. 5A and 5B, the tapered portion 124 is a stacked structure. A stacked structure is any union of geometric shapes assembled to form the tapered portion 124. For example, a stacked structure may be made from the union of two quadrilaterals (e.g., the rectangles illustrated in FIGS. 5A and 5B, a trapezoid and a rectangle, etc.). The stacked structure of FIGS. 5A and 5B comprises two quadrilateral shapes 128A and 128B. The quadrilateral shape 128A includes the main-pole-facing edge 125A, which has a length 122A. The quadrilateral shape 128B includes the main-pole-facing edge 125B, which has a length equal to the maximum height 122B of the tapered portion 124 minus the length 122A.

The tapered portion 124 of the second return pole 120 extends toward the main pole 130 and has a maximum height 122B, as measured from the ABS 150. The main-pole-facing edge 125A and a projection of the main pole edge 131 to the ABS 150 are separated by a distance 142A at the ABS 150. The main-pole-facing edge 125B is recessed from the ABS 150. Its distance from the projection of the edge 131 is the distance 142B, as shown in FIGS. 5A and 5B.

At the ABS 150, the main pole 130 and the second return pole 120 are separated by a distance 170. The distance 170 may be, for example, between approximately 600 nm and approximately 1000 nm. The maximum height 122B, the length 122A, the distances 136, 142A, 142B, and 170, the angle 134, and the lengths of the edges 125A, 125B, 133 (as well as any other characteristics, e.g., dimensions, materials, etc.) may be selected or optimized (e.g., jointly) to provide a desired level of improvement in the flux closure.

Figure 6A:
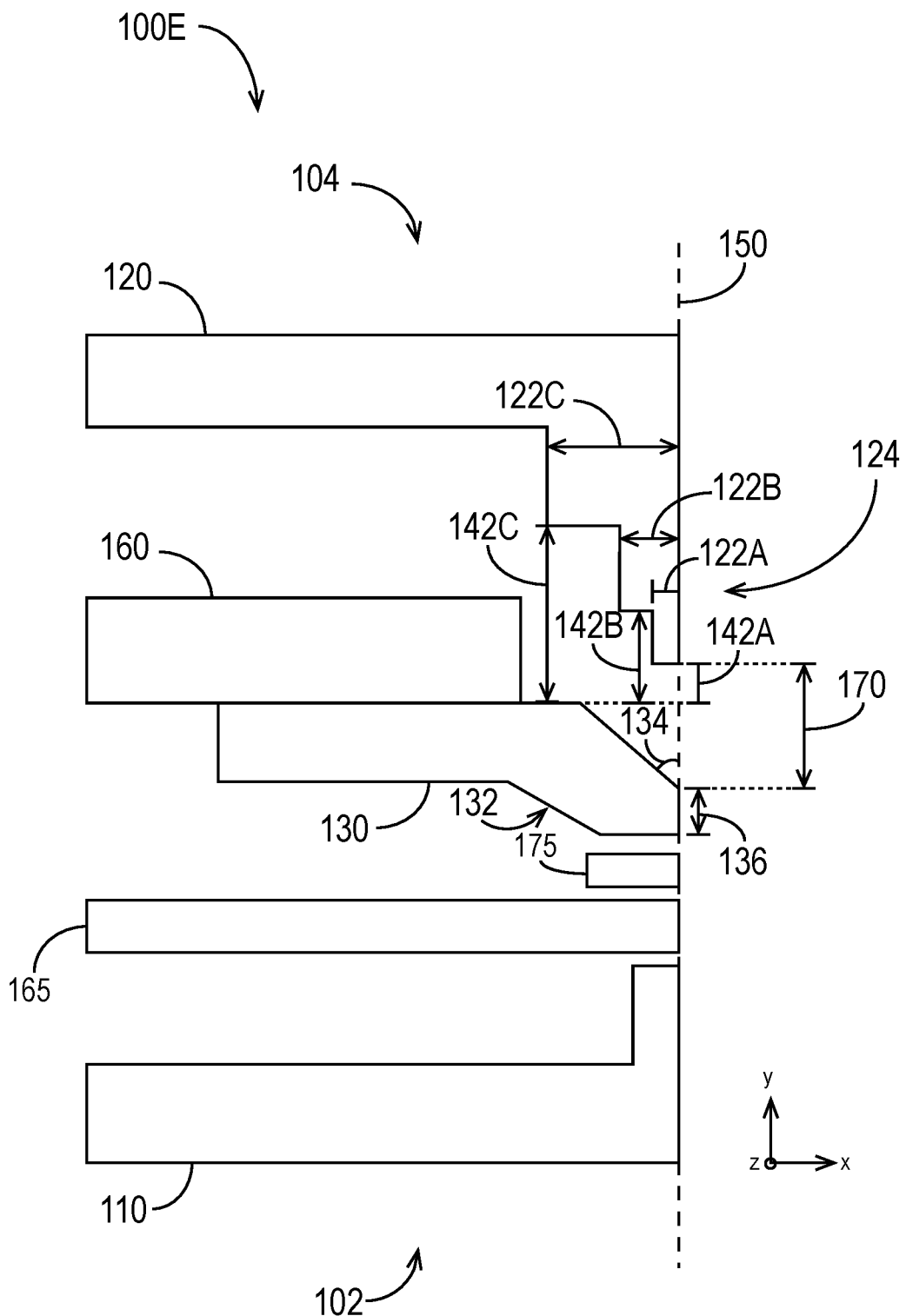
FIG. 6A is a cross-sectional schematic of a portion of an exemplary magnetic write head in accordance with some embodiments.
Figure 6B:
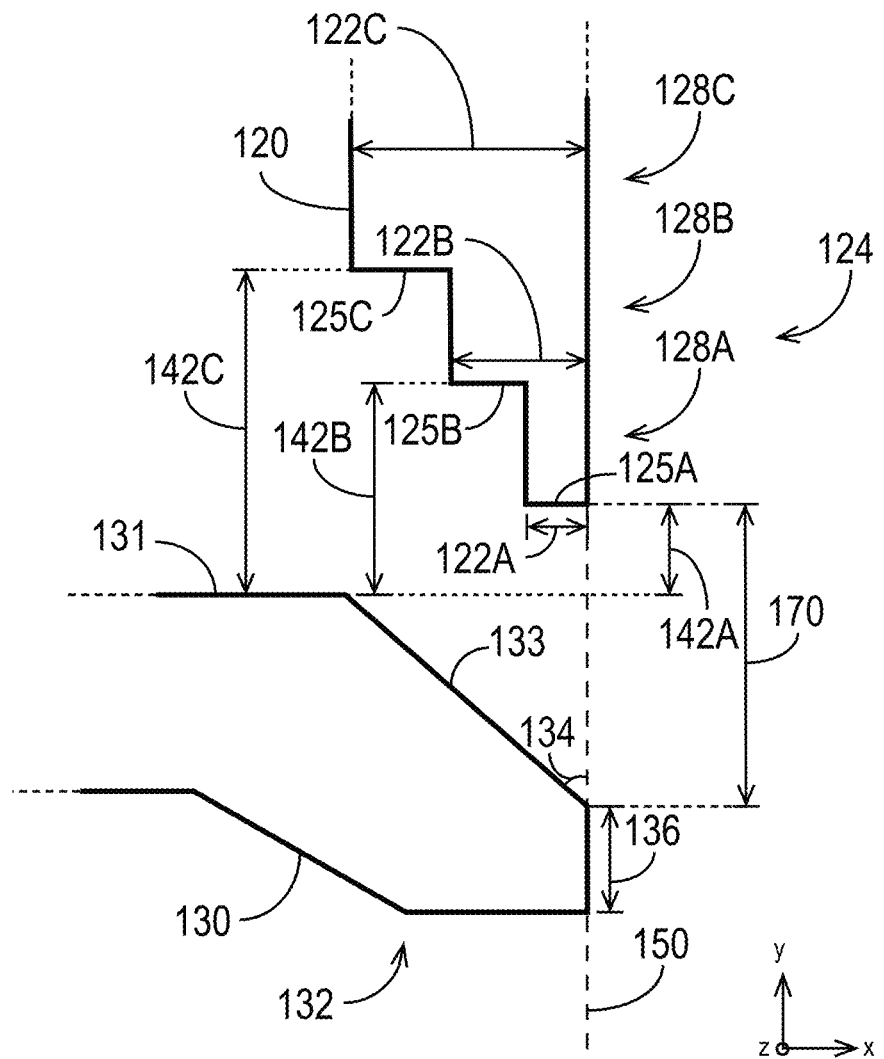
FIG. 6B is a closer view of portions of the main pole and second return pole.

FIG. 6A is a cross-sectional schematic of a portion of an exemplary magnetic write head 100E in accordance with some embodiments, and FIG. 6B is a closer view of portions of the main pole 130 and second return pole 120 of the magnetic write head 100E. Like the magnetic write heads 100A, 100B, 100C, and 100D of FIGS. 2A-5B, the magnetic write head 100E of FIGS. 6A and 6B includes a main pole 130, a stitch layer 160, a first return pole 110, a waveguide 165, a NFT 175, and a second return pole 120. The stitch layer 160, waveguide 165, NFT 175, and first return pole 110 were described in the discussion of FIG. 2, and that description is not repeated here. The main pole 130 with a tapered portion 132 was described in the discussion of FIGS. 3A and 3B, and that description is not repeated here.

The exemplary magnetic write head 100E also includes a second return pole 120 with a tapered portion 124. The tapered portion 124 has a maximum height 122C, as measured from the ABS 150. In the exemplary embodiment of FIGS. 6A and 6B, the tapered portion 124 is a stacked structure comprising three quadrilateral shapes 128A, 128B, 128C. In the exemplary embodiment of FIGS. 6A and 6B, the three quadrilateral shapes 128A, 128B, and 128C are rectangles, but it is to be understood that other shapes may also or alternatively be used. The quadrilateral shape 128A includes the main-pole-facing edge 125A, which has a length 122A. The quadrilateral shape 128B includes the main-pole-facing edge 125B, which has length equal to the height 122B minus the length 122A. The quadrilateral shape 128C includes the main-pole-facing edge 125C, which has length equal to the maximum height 122C minus the height 122B.

The tapered portion 124 of the second return pole 120 extends toward the main pole 130. The main-pole-facing edge 125A and a projection of the main pole edge 131 to the ABS 150 are separated by a distance 142A at the ABS 150. The main-pole-facing edge 125B is recessed from the ABS 150. Its distance from the projection of the edge 131 is the distance 142B, as shown in FIGS. 5A and 5B. Similarly, the main-pole-facing edge 125C is also recessed from the ABS 150. Its distance from the projection of the edge 131 is the distance 142C, as shown in FIGS. 6A and 6B.

At the ABS 150, the main pole 130 and the second return pole 120 are separated by a distance 170. The distance 170 may be, for example, between approximately 600 nm and approximately 1000 nm. The heights 122B, 122C, the length 122A, the distances 136, 142A, 142B, 142C, 170, and 136, the angle 134, and the lengths of the edges 125A, 125B, 133 (as well as any other characteristics, e.g., dimensions, materials, etc.) may be selected or optimized (e.g., jointly) to provide a desired level of improvement in the flux closure.

It is to be understood that the stacked structures illustrated in FIGS. 5A through 6B are merely examples of stacked structures. They are not meant to limit the characteristics of stacked structures that may form the tapered portion 124 of the second return pole. As explained above, the shapes making up a stacked structure need not be rectangular in shape. Any suitable shapes (e.g., triangles, quadrilaterals, etc.) may be used. The stacked structure may include additional or alternative components (e.g., more than two or three shapes), which may have any suitable size and shape. Moreover, each shape making up the stacked structure may be a combination of shapes (e.g., a trapezoid stacked on a rectangle).

FIGS. 3A through 6B illustrate one embodiment of a tapered main pole 130. FIGS. 7A through 9B illustrate several other embodiments.

Figure 7A:
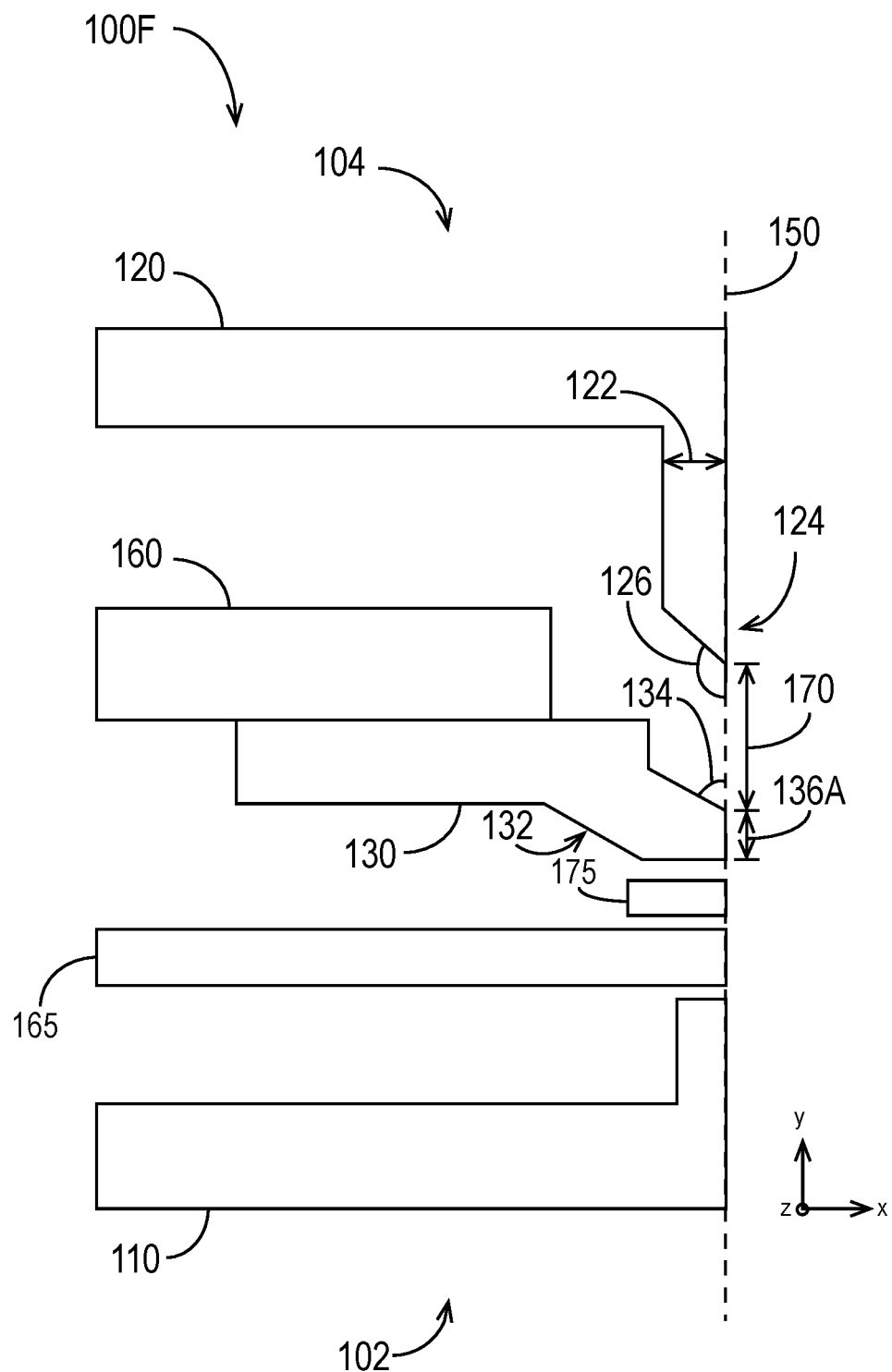
FIG. 7A is a cross-sectional schematic of a portion of an exemplary magnetic write head in accordance with some embodiments.
Figure 7B:
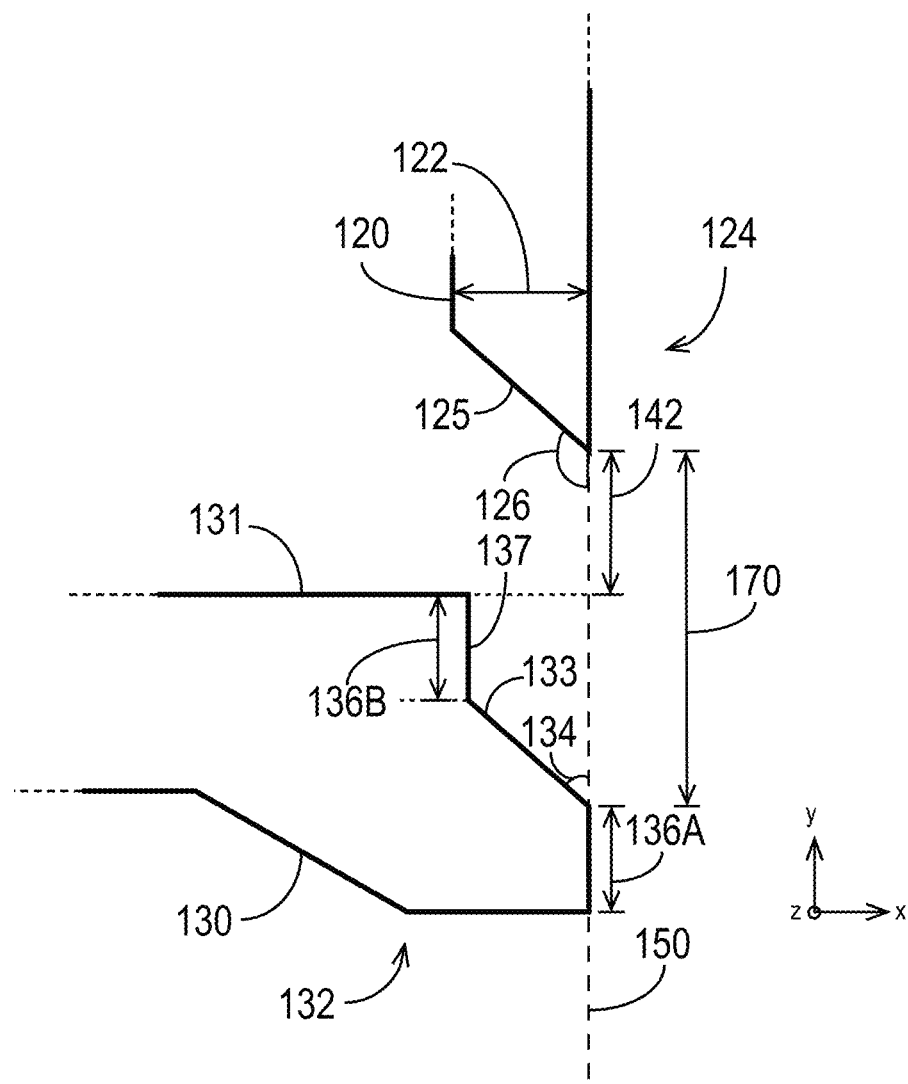
FIG. 7B is a closer view of portions of the main pole and second return pole.

FIG. 7A is a cross-sectional schematic of a portion of an exemplary magnetic write head 100F in accordance with some embodiments, and FIG. 7B is a closer view of portions of the main pole 130 and second return pole 120 of the magnetic write head 100F. Like the magnetic write heads 100A, 100B, 100C, 100D, 100E of FIGS. 2A-6B, the magnetic write head 100F of FIGS. 7A and 7B includes a main pole 130, a stitch layer 160, a first return pole 110, a waveguide 165, a NFT 175, and a second return pole 120. The stitch layer 160, waveguide 165, NFT 175, and first return pole 110 were described in the discussion of FIG. 2, and that description is not repeated here. The second return pole 120 with a tapered portion 124 as shown in FIGS. 7A and 7B was described in the discussion of FIGS. 4A and 4B, and that description is not repeated here. It is to be understood that although FIGS. 7A and 7B show the tapered portion 124 from FIGS. 4A and 4B, the tapered portion 124 may have any suitable shape and characteristics. Other exemplary embodiments of the tapered portion were discussed in the descriptions of FIGS. 5A-6B.

The main pole 130 includes a tapered portion 132 at the ABS 150 (i.e., the tapered portion 132 extends to the ABS 150). At the ABS 150, the tapered portion 132 extends for a distance 136A in the down-track direction (i.e., in the y-direction using the axes shown in FIGS. 7A and 7B).

The tapered portion 132 has a trailing-side edge 133 that is at an angle 134 to the ABS 150. In the embodiment shown in FIGS. 7A and 7B, the angle 134 is less than 90 degrees. The tapered portion 132 also has an edge 137 that extends toward the second return pole 120 and is substantially parallel to the ABS 150. The edge 137 has a length 136B.

At the ABS 150, the main pole 130 and the second return pole 120 are separated by a distance 170. The distance 170 may be, for example, between approximately 600 nm and approximately 1000 nm. The height 122, the distances 136A, 136B, 142, and 170, the angle 134, and the length of the edge 133 (and other characteristics, including other dimensions, angles, materials, etc.) may be selected or optimized (e.g., jointly) to provide a desired level of improvement in the flux closure.

Figure 8A:
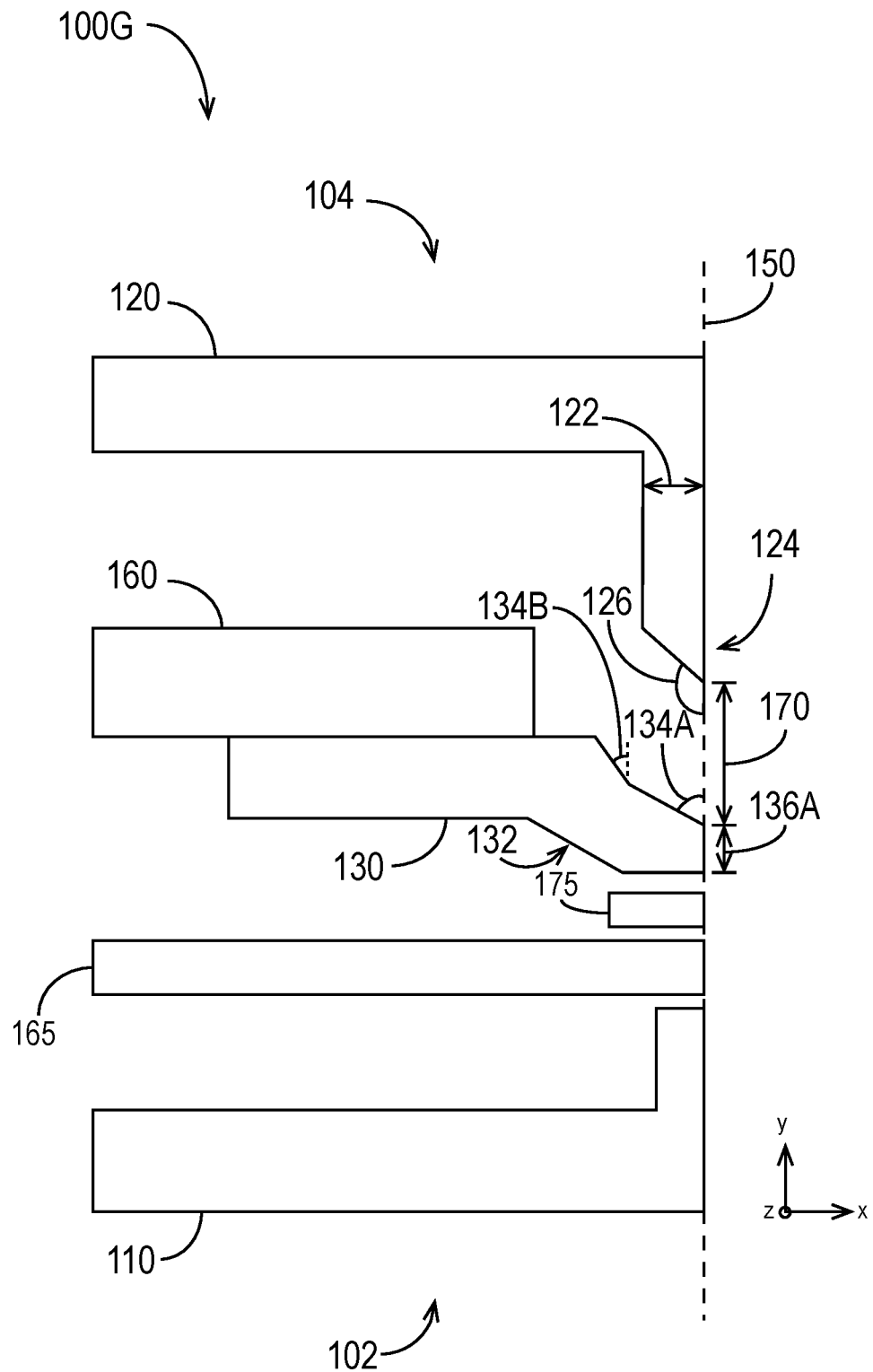
FIG. 8A is a cross-sectional schematic of a portion of an exemplary magnetic write head in accordance with some embodiments.
Figure 8B:
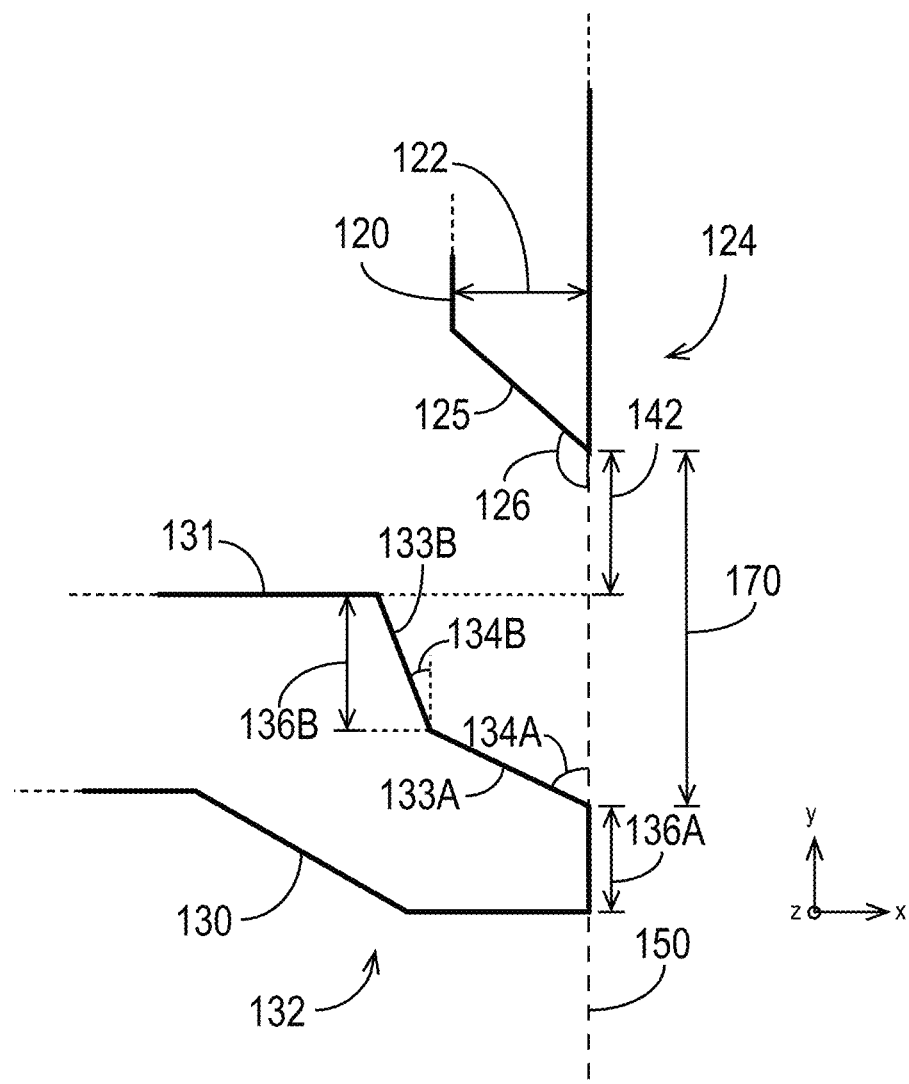
FIG. 8B is a closer view of portions of the main pole and second return pole.

FIG. 8A is a cross-sectional schematic of a portion of an exemplary magnetic write head 100G in accordance with some embodiments, and FIG. 8B is a closer view of portions of the main pole 130 and second return pole 120 of the magnetic write head 100G. Like the magnetic write heads 100A, 100B, 100C, 100D, 100E, and 100F of FIGS. 2A-7B, the magnetic write head 100G of FIGS. 8A and 8B includes a main pole 130, a stitch layer 160, a first return pole 110, a waveguide 165, a NFT 175, and a second return pole 120. The stitch layer 160, waveguide 165, NFT 175, and first return pole 110 were described in the discussion of FIG. 2, and that description is not repeated here. The second return pole 120 with a tapered portion 124 as shown in FIGS. 8A and 8B was described in the discussion of FIGS. 4A and 4B, and that description is not repeated here. It is to be understood that although FIGS. 8A and 8B show the tapered portion 124 from FIGS. 4A and 4B, the tapered portion 124 may have any suitable shape and characteristics. Other exemplary embodiments of the tapered portion were discussed in the descriptions of FIGS. 5A-6B.

The main pole 130 includes a tapered portion 132 at the ABS 150 (i.e., the tapered portion 132 extends to the ABS 150). At the ABS 150, the tapered portion 132 extends for a distance 136A in the down-track direction (i.e., in the y-direction using the axes shown in FIGS. 8A and 8B). At the ABS 150, the main pole 130 and the second return pole 120 are separated by a distance 170. The distance 170 may be, for example, between approximately 600 nm and approximately 1000 nm.

The tapered portion 132 has a first trailing-side edge 133A that is at an angle 134A to the ABS 150. In the embodiment shown in FIGS. 8A and 8B, the angle 134A is less than 90 degrees. The tapered portion 132 also has a second trailing-side edge 133B that is recessed from and at an angle 134B to the ABS 150. In the embodiment of FIGS. 8A and 8B, the angle 134B is less than the angle 134A. In other embodiments, the angles 134A, 134B are substantially equal, or the angle 134B is greater than the angle 134A. The angle 134B may be approximately zero, thereby making the trailing-side edge 133B substantially parallel to (but recessed from) the ABS 150. The first and second trailing-side edges 133A, 133B intersect at a point that is a distance 136B from a projection toward the ABS 150 of the main pole edge 131. As will be appreciated by skilled artisans, the lengths of the trailing-side edges 133A, 133B may be derived using trigonometry and, for example, the distances 136B, 142, 170 and the angles 134A, 134B. For example, the length of the trailing-side edge 133B is the distance 136B divided by the cosine of the angle 134B, and the length of the trailing-side edge 133A is the distance 170, minus the distances 136B, 142, divided by the cosine of the angle 134A.

The height 122, the distances 136A, 136B, 142, and 170, the angles 134A, 134B, and the lengths of the edges 133A, 133B (and other characteristics, including other dimensions, angles, materials, etc.) may be selected or optimized (e.g., jointly) to provide a desired level of improvement in the flux closure.

Figure 9A:
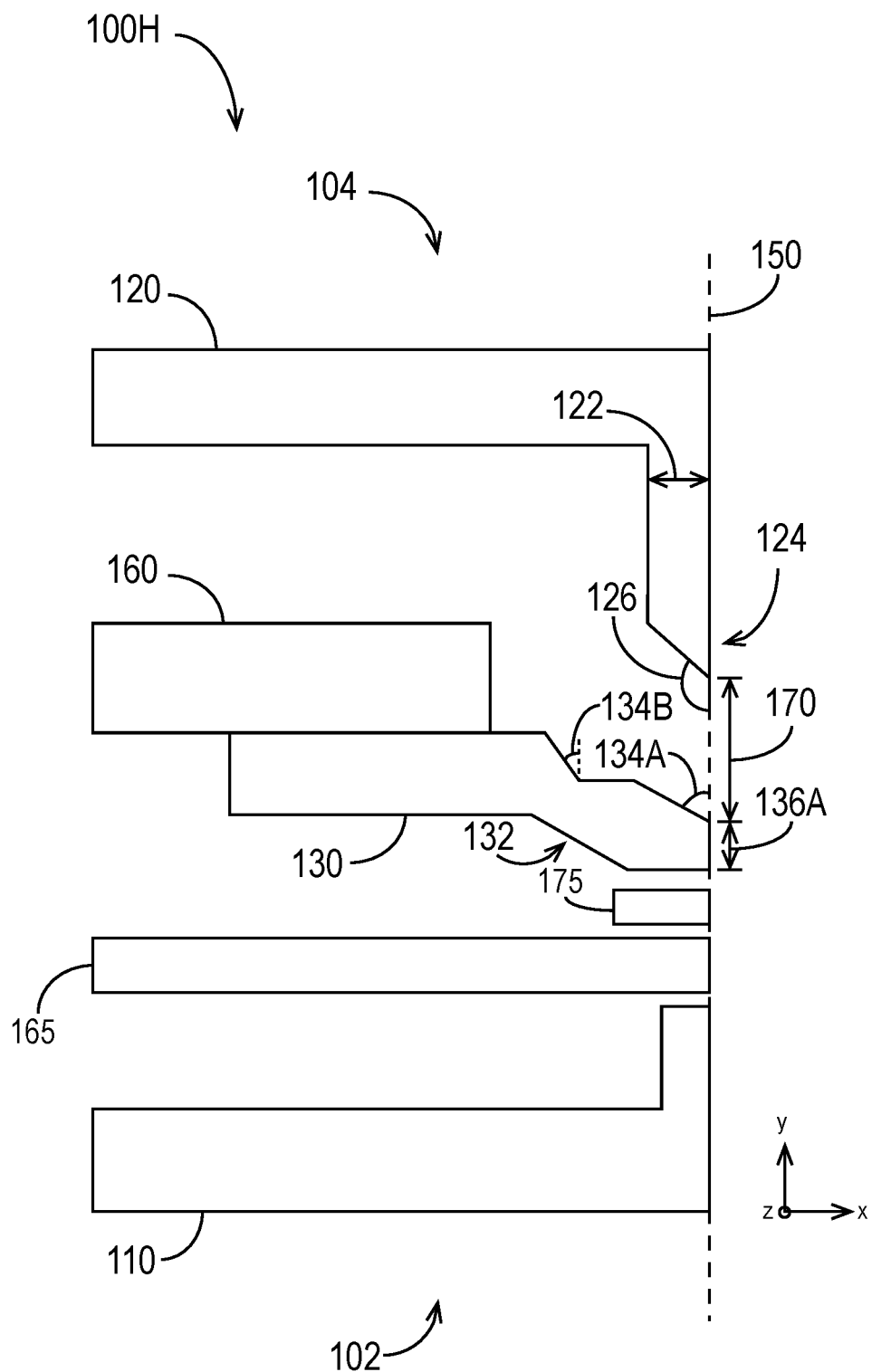
FIG. 9A is a cross-sectional schematic of a portion of an exemplary magnetic write head in accordance with some embodiments.
Figure 9B:
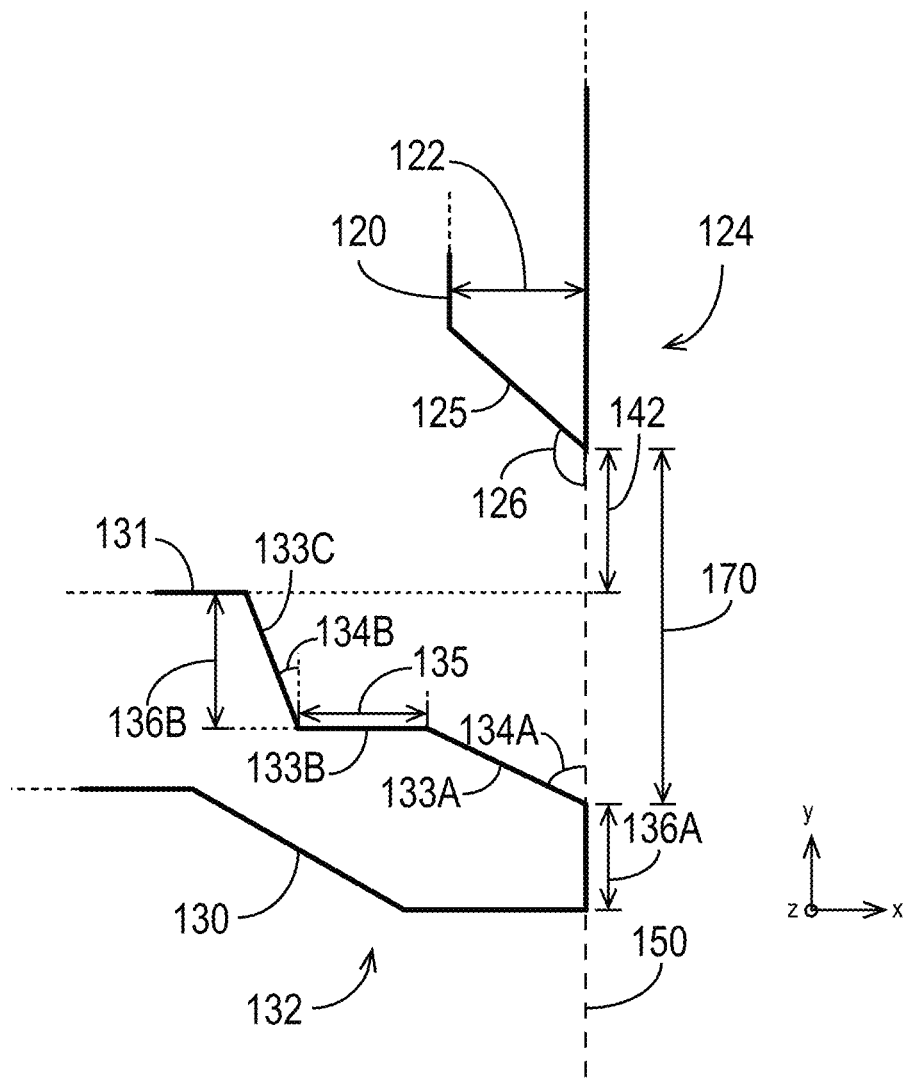
FIG. 9B is a closer view of portions of the main pole and second return pole.

FIG. 9A is a cross-sectional schematic of a portion of an exemplary magnetic write head 100H in accordance with some embodiments, and FIG. 9B is a closer view of portions of the main pole 130 and second return pole 120 of the magnetic write head 100H. Like the magnetic write heads 100A, 100B, 100C, 100D, 100E, 100F, and 100G of FIGS. 2A-8B, the magnetic write head 100H of FIGS. 9A and 9B includes a main pole 130, a stitch layer 160, a first return pole 110, a waveguide 165, a NFT 175, and a second return pole 120. The stitch layer 160, a waveguide 165, a NFT 175, and first return pole 110 were described in the discussion of FIG. 2, and that description is not repeated here. The second return pole 120 with a tapered portion 124 as shown in FIGS. 9A and 9B was described in the discussion of FIGS. 4A and 4B, and that description is not repeated here. It is to be understood that although FIGS. 9A and 9B show the tapered portion 124 from FIGS. 4A and 4B, the tapered portion 124 may have any suitable shape and characteristics. Other exemplary embodiments of the tapered portion were discussed in the descriptions of FIGS. 5A-6B.

The main pole 130 includes a tapered portion 132 at the ABS 150 (i.e., the tapered portion 132 extends to the ABS 150). At the ABS 150, the tapered portion 132 extends for a distance 136A in the down-track direction (i.e., in the y-direction using the axes shown in FIGS. 9A and 9B). At the ABS 150, the main pole 130 and the second return pole 120 are separated by a distance 170. The distance 170 may be, for example, between approximately 600 nm and approximately 1000 nm.

The tapered portion 132 has a first trailing-side edge 133A that is at an angle 134A to the ABS 150. In the embodiment shown in FIGS. 9A and 9B, the angle 134A is less than 90 degrees. The tapered portion 132 also has a second trailing-side edge 133B that is recessed from and substantially perpendicular to the ABS 150. In other embodiments, the second trailing-side edge 133B is not perpendicular to the ABS 150. The second trailing-side edge 133B has a length 135 and is a distance 136B from a projection toward the ABS 150 of the main pole edge 131. The tapered portion 132 also has a third trailing-side edge 133C that is recessed from and at an angle 134B to the ABS 150. In the embodiment of FIGS. 9A and 9B, the angle 134B is less than the angle 134A. In other embodiments, the angles 134A, 134B are substantially equal, or the angle 134B is greater than the angle 134A. The angle 134B may be approximately zero, making the third trailing-side edge 133C substantially parallel to (but recessed from) the ABS 150.

As will be appreciated by skilled artisans, the lengths of the trailing-side edges 133A, 133C may be derived using trigonometry and, for example, the distances 136B, 142, 170 and the angles 134A, 134B.

The height 122, the distances 136A, 136B, 142, and 170, the angles 134A, 134B, the length 135, and the lengths of the edges 133A, 133C (and other characteristics, including other dimensions, angles, materials, etc.) may be selected or optimized (e.g., jointly) to provide a desired level of improvement in the flux closure.

Figure 10:
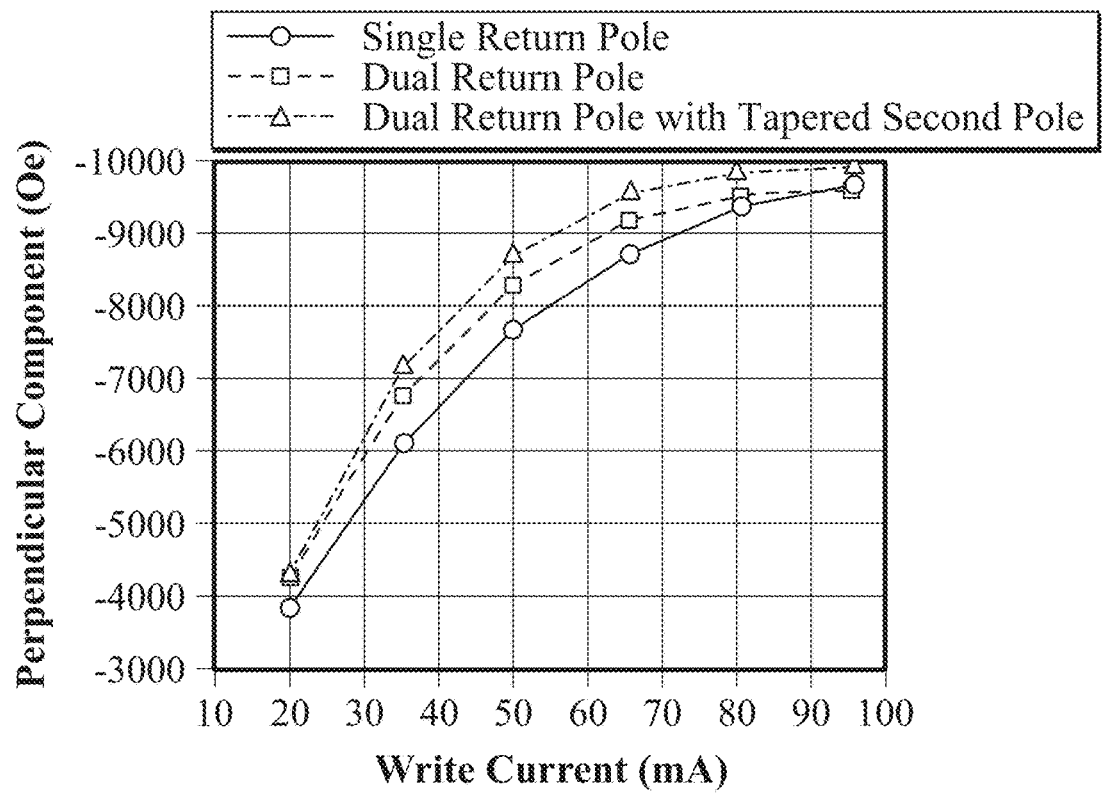
FIG. 10 is a plot comparing the perpendicular component of the magnetic field as a function of the write current for a write head with a single return pole to that of a write head with two return poles as disclosed herein.

FIG. 10 is a plot comparing the perpendicular component of the magnetic field, in Oersted, as a function of the write current, in mA, for a write head with a single return pole to that of a write head with two return poles as disclosed herein. As FIG. 10 illustrates, the addition of a second return pole results in a substantial increase in the perpendicular component of the magnetic field for a selected write current. Stated another way, the addition of a second return pole enables the write head to provide a target perpendicular field using a lower write current.

Figure 11:
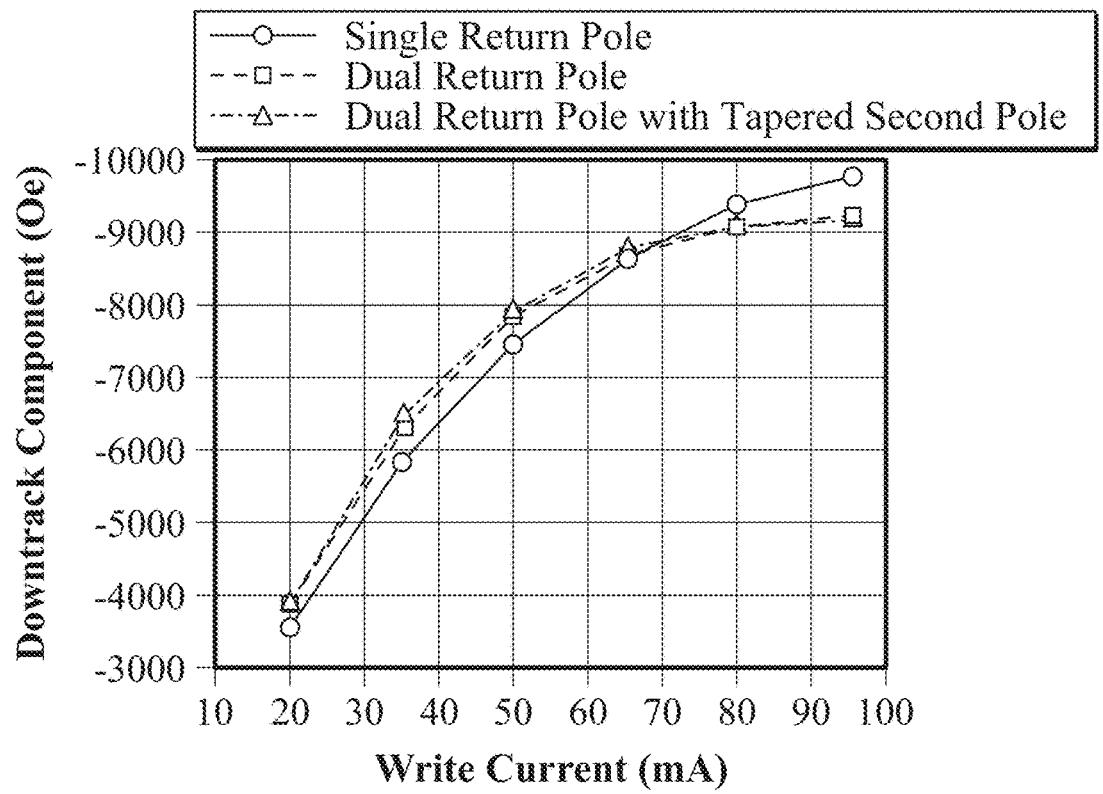
FIG. 11 is a plot comparing the down-track magnetic field as a function of write current for a write head with a single return pole to that of a write head with two return poles as disclosed herein.

FIG. 11 is a plot comparing the down-track magnetic field, in Oersted, as a function of write current, in mA, for a write head with a single return pole to that of a write head with two return poles as disclosed herein. As FIG. 11 illustrates, the addition of a second return pole results in a slightly higher magnetic field in the down-track direction for a selected write current up to about 70 mA. But, as FIG. 10 shows, the increase in down-track component of the magnetic field is more than offset by the gains in the perpendicular component. As a result, overall performance of the write head is improved with the use of a second return pole as described herein.

Figure 12:
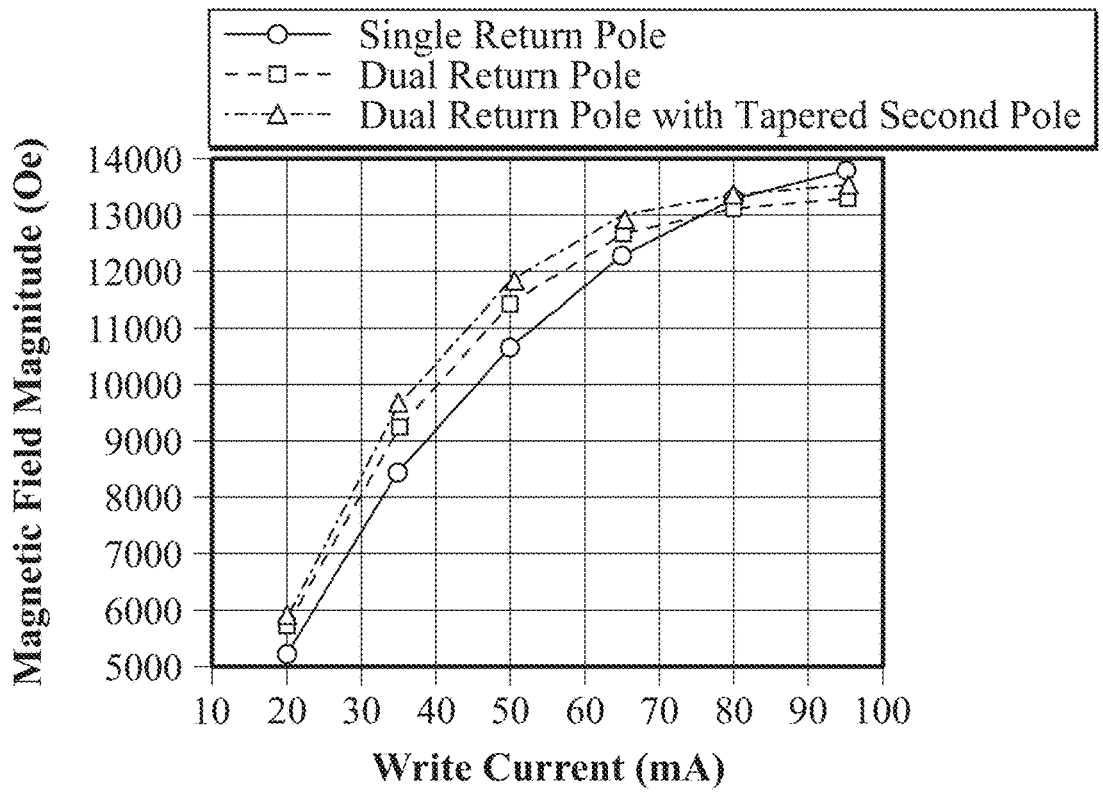
FIG. 12 is a plot comparing the magnitude of the magnetic field as a function of write current for a write head with a single return pole to that of a write head with two return poles as disclosed herein.

FIG. 12 is a plot comparing the magnitude of the magnetic field, in Oersted, as a function of write current, in mA, for a write head with a single return pole to that of a write head with two return poles as disclosed herein. As FIG. 12 illustrates, the addition of a second return pole results in a higher magnetic field magnitude for a selected write current up to about 80 mA. Stated another way, the addition of a second return pole enables the write head to provide a target magnetic field magnitude using a lower write current.

Figure 13:
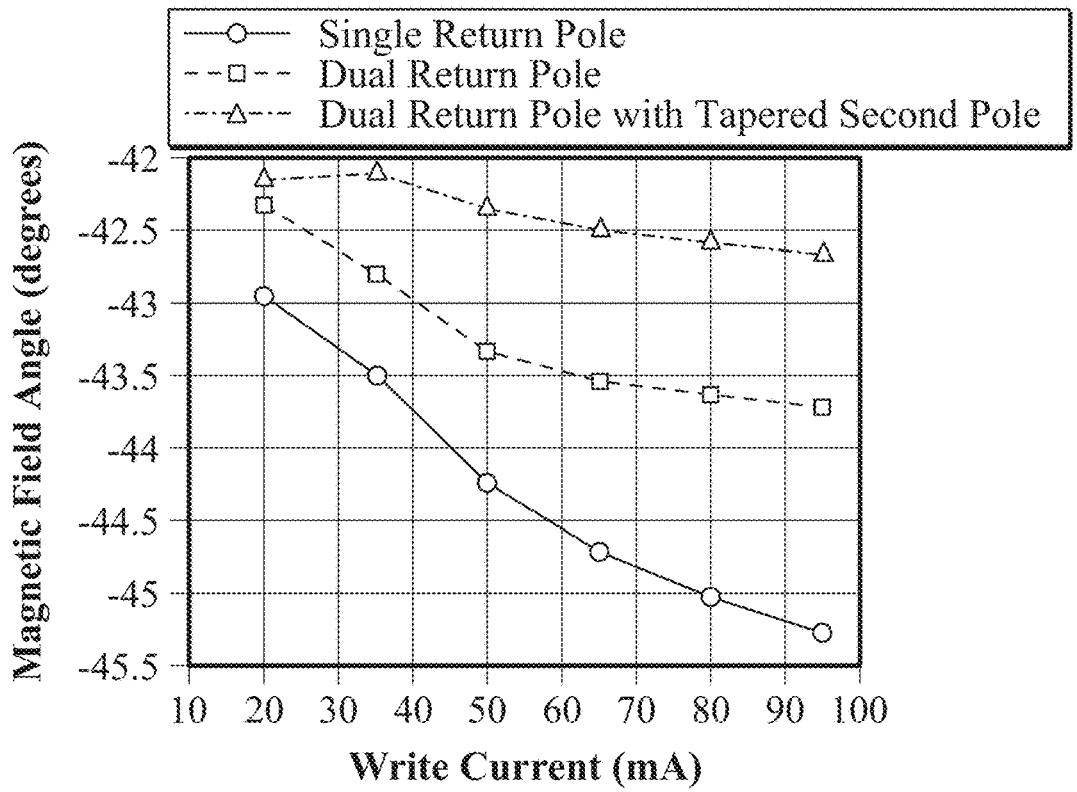
FIG. 13 is a plot comparing the angle of the magnetic field as a function of write current for a write head with a single return pole to that of a write head with two return poles as disclosed herein.

FIG. 13 is a plot comparing the angle of the magnetic field as a function of write current for a write head with a single return pole to that of a write head with two return poles as disclosed herein. As shown in FIG. 13, the angle of the field is largely unaffected by the addition of the second return pole.

Figure 14:
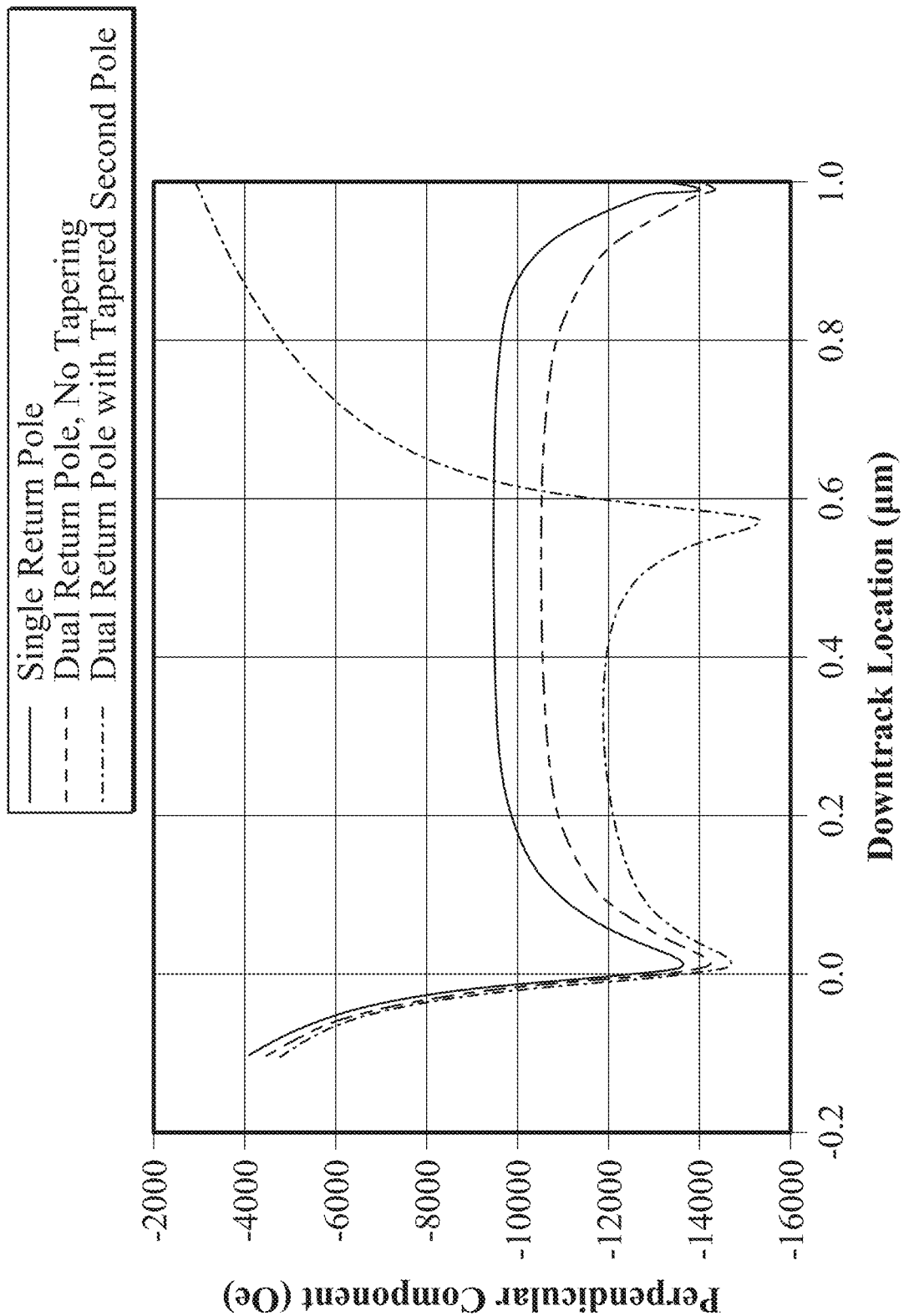
FIG. 14 is a plot comparing the perpendicular component of the magnetic field as a function of down-track location for three write heads.

FIG. 14 is a plot comparing the perpendicular component of the magnetic field as a function of down-track location for exemplary three write heads. The solid curve corresponds to a write head has only a single return pole. The other two curves correspond to write heads that have two return poles as disclosed herein. The dashed curve illustrates the perpendicular component of a write head with a non-tapered second return pole, and the dash-dot curve illustrates the perpendicular component of a write head with a tapered second return pole. As FIG. 14 shows, the addition of a second return pole provides a stronger perpendicular component at all locations of interest in the down-track direction. As the dash-dot curve shows, tapering the second return pole reduces the distance between the main pole and the second return pole, which causes the peak in the perpendicular component to occur at a down-track location of just under 0.6 microns. In contrast, the peaks for the single-return-pole write head and the dual-return-pole write head without a tapered second return pole are near 1 micron.

Figure 15:
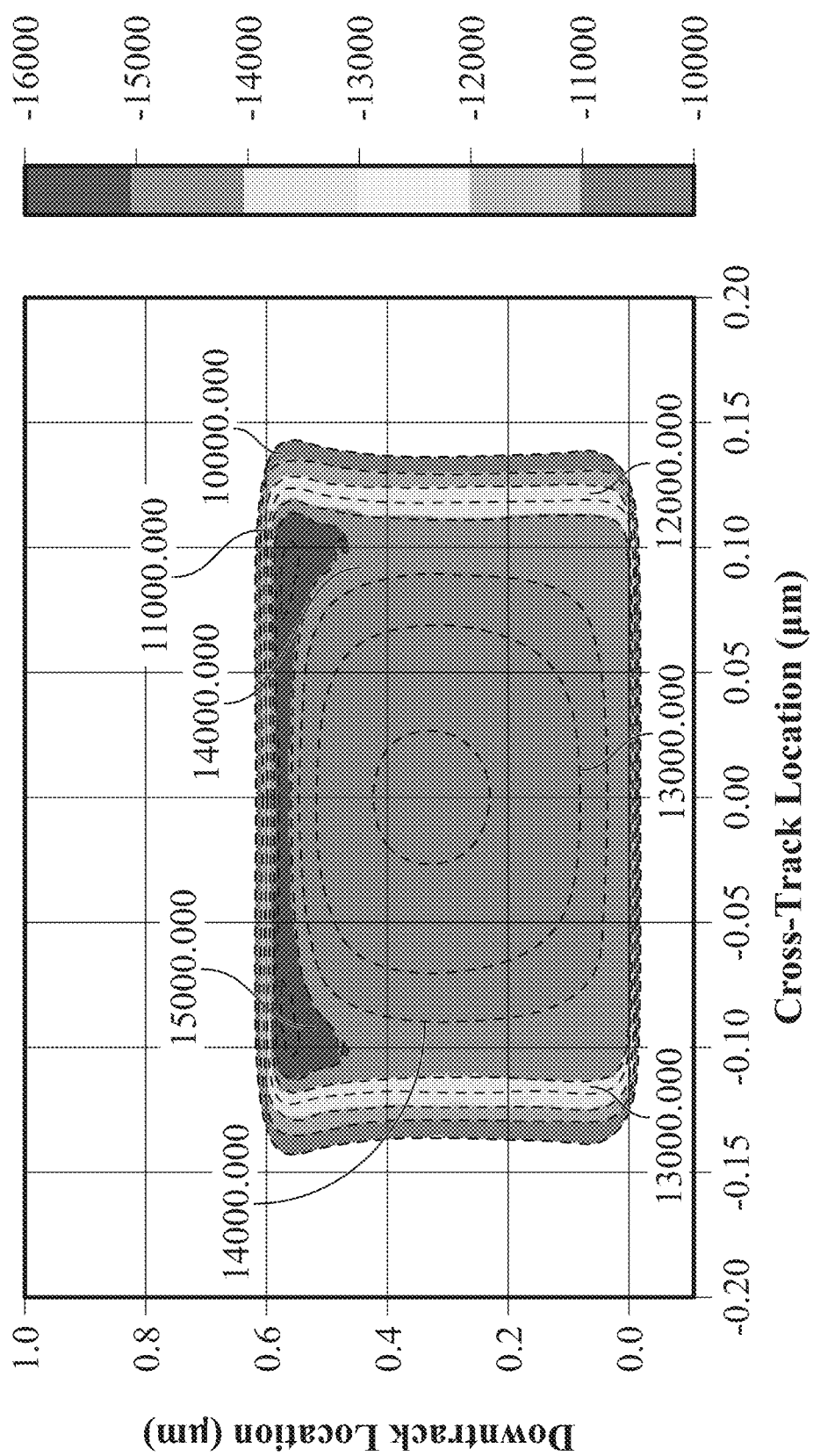
FIG. 15 is a two-dimensional plot of the perpendicular component of the write field generated by the write head corresponding to the dash-dot curve of FIG. 14.

FIG. 15 is a two-dimensional plot of the perpendicular component of the write field generated by the write head corresponding to the dash-dot curve of FIG. 14. As shown, the maximum amplitude of the perpendicular component of the write field in the down-track direction occurs at just under 0.6 microns at the center (0.00 cross-track).

It will be appreciated that there are nearly limitless combinations of main poles 130 and second return poles 120 that may take advantage of the disclosures herein. The illustrative embodiments shown herein are simply examples of different main pole 130 and second return pole 120 combinations. Other combinations are possible. As just one example, the tapered main poles 130 illustrated in FIGS. 7A-9B may be used in combination with any of the tapered second return poles 120 illustrated in FIGS. 5A-6B. Likewise, a particular implementation may include a tapered main pole 130 and a non-tapered second return pole 120, or a non-tapered main pole 130 and a tapered second return pole 120. Similarly, an implementation may include a non-tapered main pole 130 and a non-tapered second return pole 120.

Moreover, although the disclosure herein discusses tapering of the second return pole 120, the first return pole 110 may also or alternatively be tapered. Tapered return poles 110 for use in HAMR write heads are disclosed in co-pending U.S. patent application Ser. No. 16/022,273, filed Jun. 28, 2018, and entitled "MAGNETIC WRITE HEAD WITH A TAPERED RETURN POLE." The entirety of the contents of U.S. patent application Ser. No. 16/022,273 are hereby incorporated by reference for all purposes.

In the foregoing description and in the accompanying drawings, specific terminology has been set forth to provide a thorough understanding of the disclosed embodiments. In some instances, the terminology or drawings may imply specific details that are not required to practice the invention.

It is to be understood that although the disclosure is presented herein in the context of HAMR, the concepts and exemplary embodiments are not limited to HAMR implementations. The techniques and embodiments disclosed herein may be used in other types of write heads and other types of data storage devices.

To avoid obscuring the present disclosure unnecessarily, well-known components (e.g., of a magnetic write head) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A heat-assisted magnetic recording (HAMR) write head, comprising:
an air-bearing surface (ABS);

a main pole extending to the ABS;

a first return pole extending to the ABS and disposed, at the ABS, between the main pole and a leading side of the magnetic write head;

a waveguide extending to the ABS and disposed, at the ABS, between the first return pole and the main pole;

a near-field transducer extending to the ABS and disposed, at the ABS, between the waveguide and the main pole; and a second return pole disposed between the main pole and a trailing side of the magnetic write head, wherein the second return pole comprises a tapered portion adjacent to the ABS, wherein the tapered portion extends in a direction toward the main pole, and wherein a distance between the main pole and the second return pole is between approximately 600 nm and approximately 1000 nm.

2. The HAMR write head recited in claim 1, wherein the tapered portion is a first tapered portion, and wherein the main pole comprises a second tapered portion at the ABS, wherein the second tapered portion comprises a trailing-side edge at an angle to the ABS, wherein the angle is less than 90 degrees.

3. The HAMR write head recited in claim 2, wherein the trailing-side edge is a first trailing-side edge and the angle is a first angle, and wherein the second tapered portion further comprises a second trailing-side edge recessed from the ABS and at a second angle from the ABS, wherein the second angle is less than 90 degrees.

4. The HAMR write head recited in claim 3, wherein the first and second angles are substantially equal.

5. The HAMR write head recited in claim 3, wherein the second angle is less than the first angle.

6. The HAMR write head recited in claim 5, wherein the second angle is approximately zero.

7. The HAMR write head recited in claim 3, wherein the second tapered portion further comprises a third trailing-side edge, wherein the third trailing-side edge is disposed between the first trailing-side edge and the second trailing-side edge, and wherein the third trailing-side edge is substantially perpendicular to the ABS.

8. The HAMR write head recited in claim 1, wherein the tapered portion comprises a main-pole-facing edge at an angle from the ABS, wherein the angle is greater than 90 degrees.

9. The HAMR write head recited in claim 1, wherein the tapered portion comprises a first main-pole-facing edge and a second main-pole-facing edge, wherein each of the first and second main-pole-facing edges is substantially perpendicular to the ABS.

10. The HAMR write head recited in claim 9, wherein the tapered portion further comprises a third main-pole-facing edge, wherein the third main-pole-facing edge is substantially perpendicular to the ABS.

11. A magnetic storage system comprising the HAMR write head recited in claim 1.

12. The HAMR write head recited in claim 1, wherein the tapered portion comprises a stacked structure.

13. The HAMR write head recited in claim 1, wherein the tapered portion comprises a wedge.

14. The HAMR write head recited in claim 1, wherein the tapered portion is a first tapered portion, and wherein the main pole comprises a second tapered portion adjacent to the ABS, wherein the second tapered portion extends in a direction toward the first return pole.

15. The HAMR write head recited in claim 14, wherein the first tapered portion comprises a wedge or a stacked structure.

16. The HAMR write head recited in claim 14, wherein the second tapered portion comprises an edge facing the second return pole, wherein the edge is at an angle to the ABS, wherein the angle is less than 90 degrees.

* * * * *